(12) United States Patent
Arisawa et al.

(10) Patent No.: US 9,162,559 B2
(45) Date of Patent: Oct. 20, 2015

(54) FUEL CELL SYSTEM AND VEHICLE

(75) Inventors: Hiroshi Arisawa, Susono (JP); Manabu Takahashi, Toyota (JP); Hiroyuki Imanishi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 574 days.

(21) Appl. No.: 13/259,902

(22) PCT Filed: May 28, 2009

(86) PCT No.: PCT/JP2009/059774
§ 371 (c)(1),
(2), (4) Date: Sep. 23, 2011

(87) PCT Pub. No.: WO2010/137147
PCT Pub. Date: Dec. 2, 2010

(65) Prior Publication Data
US 2012/0015257 A1    Jan. 19, 2012

(51) Int. Cl.
*H01M 8/00* (2006.01)
*B60K 1/04* (2006.01)
(Continued)

(52) U.S. Cl.
CPC . *B60K 1/04* (2013.01); *B60L 1/003* (2013.01); *B60L 7/14* (2013.01); *B60L 11/1803* (2013.01); *B60L 11/1885* (2013.01); *B60L 11/1887* (2013.01); *B60L 11/1892* (2013.01); *B60L 11/1896* (2013.01); *B60L 11/1898* (2013.01); *B62D 21/152* (2013.01); *B62D 21/157* (2013.01); *H01M 8/00* (2013.01); *B60K 2001/0422* (2013.01); *B60L 2200/26* (2013.01); *B60L 2210/40* (2013.01); *B60L 2240/421* (2013.01); *H01M 16/006* (2013.01); *H01M 2250/20* (2013.01); *Y02E 60/50* (2013.01); *Y02T 10/642* (2013.01); *Y02T 10/7241* (2013.01); *Y02T 90/32* (2013.01); *Y02T 90/34* (2013.01)

(58) Field of Classification Search
USPC ........................................ 429/400
See application file for complete search history.

(56) References Cited

U.S. PATENT DOCUMENTS 5,515,939 A    5/1996    Korall et al.
5,555,950 A    9/1996    Harada et al.
(Continued)

FOREIGN PATENT DOCUMENTS

| CN | 1482971 A | 3/2004 |
|---|---|---|
| CN | 101395023 A | 3/2009 |

(Continued)

OTHER PUBLICATIONS

International Search Report issued Jul. 21, 2009 of PCT/JP2009/059785.

(Continued)

*Primary Examiner* — Karie O'Neill Apicella
(74) *Attorney, Agent, or Firm* — Kenyon & Kenyon LLP

(57) ABSTRACT

A fuel-cell-system providing structure is provided which is capable of preventing a collision of a fuel cell with a related apparatus of the fuel cell while suppressing the increase in weight of a vehicle. A fuel cell system provided in a vehicle includes: a fuel cell unit in which a fuel cell is contained; and a related apparatus that is electrically connected to the fuel cell and that is located adjacent to the fuel cell unit. The related apparatus is arranged at a position closer to an outer surface of the vehicle than the fuel cell unit.

8 Claims, 13 Drawing Sheets

(51) Int. Cl.
  *B60L 1/00*    (2006.01)
  *B60L 7/14*    (2006.01)
  *B60L 11/18*   (2006.01)
  *B62D 21/15*   (2006.01)
  *H01M 16/00*   (2006.01)

(56) References Cited

U.S. PATENT DOCUMENTS

| | | |
|---|---|---|
| 6,819,066 B2 | 11/2004 | Ishikawa et al. |
| 8,037,960 B2 | 10/2011 | Kiya |
| 8,330,429 B2 | 12/2012 | Arakawa |
| 2003/0070850 A1 | 4/2003 | Reid et al. |
| 2003/0070858 A1 | 4/2003 | Kondo |
| 2003/0215687 A1 | 11/2003 | Bruck et al. |
| 2004/0129466 A1 | 7/2004 | Leifert |
| 2004/0137321 A1 | 7/2004 | Savaria et al. |
| 2004/0161654 A1 | 8/2004 | DeVries |
| 2006/0102413 A1 | 5/2006 | Ootani et al. |
| 2006/0113131 A1 | 6/2006 | Kato et al. |
| 2006/0251933 A1 | 11/2006 | Hoffjann et al. |
| 2007/0007060 A1 | 1/2007 | Ono et al. |
| 2008/0196957 A1 | 8/2008 | Koike et al. |
| 2009/0173558 A1 | 7/2009 | Watanabe et al. |

FOREIGN PATENT DOCUMENTS

| | | | |
|---|---|---|---|
| DE | 69301845 T2 | 9/1996 | |
| DE | 69302845 T2 | 11/1996 | |
| DE | 10247304 A1 | 6/2003 | |
| DE | 10242619 A1 | 3/2004 | |
| JP | 07-108956 A | 4/1995 | |
| JP | 7-117489 A | 5/1995 | |
| JP | 10-291419 A | 11/1998 | |
| JP | 2002-367648 A | 12/2002 | |
| JP | 2003-123779 A | 4/2003 | |
| JP | 2003-146087 A | 5/2003 | |
| JP | 2003-189415 A | 7/2003 | |
| JP | 2004-161092 A | 6/2004 | |
| JP | 2004-345447 A | 12/2004 | |
| JP | 2005-205945 A | 8/2005 | |
| JP | 2005-231549 A | 9/2005 | |
| JP | 2005-306104 A | 11/2005 | |
| JP | 2006-168604 A | 6/2006 | |
| JP | 2006-176105 A | 7/2006 | |
| JP | 2006-196386 A | 7/2006 | |
| JP | 2006-256442 A | 9/2006 | |
| JP | 2006-335212 A | 12/2006 | |
| JP | 2006335212 A * | 12/2006 | ............... B06K 8/00 |
| JP | 2007-015591 A | 1/2007 | |
| JP | 2007-015600 A | 1/2007 | |
| JP | 2007-015612 A | 1/2007 | |
| JP | 2007-015613 A | 1/2007 | |
| JP | 2007-015614 A | 1/2007 | |
| JP | 2007-015616 A | 1/2007 | |
| JP | 2007-039004 A | 2/2007 | |
| JP | 2007-106361 A | 4/2007 | |
| JP | 2007-209161 A | 8/2007 | |
| JP | 2007-230329 A | 9/2007 | |
| JP | 2007-237779 A | 9/2007 | |
| JP | 2007-245954 A | 9/2007 | |
| JP | 2007-258164 A | 10/2007 | |
| JP | 2007-318938 A | 12/2007 | |
| JP | 2008-100584 A | 5/2008 | |
| JP | 2008-100585 A | 5/2008 | |
| JP | 2009-023528 A | 2/2009 | |
| JP | 2009-083598 A | 4/2009 | |
| JP | 2009-148051 A | 7/2009 | |
| WO | 03/104010 A1 | 12/2003 | |
| WO | 2009/001483 A1 | 12/2009 | |

OTHER PUBLICATIONS

U.S. Office Action of Dec. 20, 2012 U.S Appl. No. 13/258,539.
International Search Report issued Jul. 21, 2009 of PCT/JP2009/059779.
International Search Report issued Jul. 21, 2009 of PCT/JP2009/059774.
International Search Report issued Jul. 21, 2009 of PCT/JP2009/059777.
Final Office Action issued on Apr. 15, 2014, in U.S. Appl. No. 13/258,523.
Notice of Allowance issued on Jul. 25, 2014, in U.S. Appl. No. 13/258,523.
Final Office Action issued on Mar. 11, 2015 in U.S. Appl. No. 13/260,101.
Corrective Notice of Allowability dated Nov. 17, 2014 for U.S. Appl. No. 13/258,523.

* cited by examiner

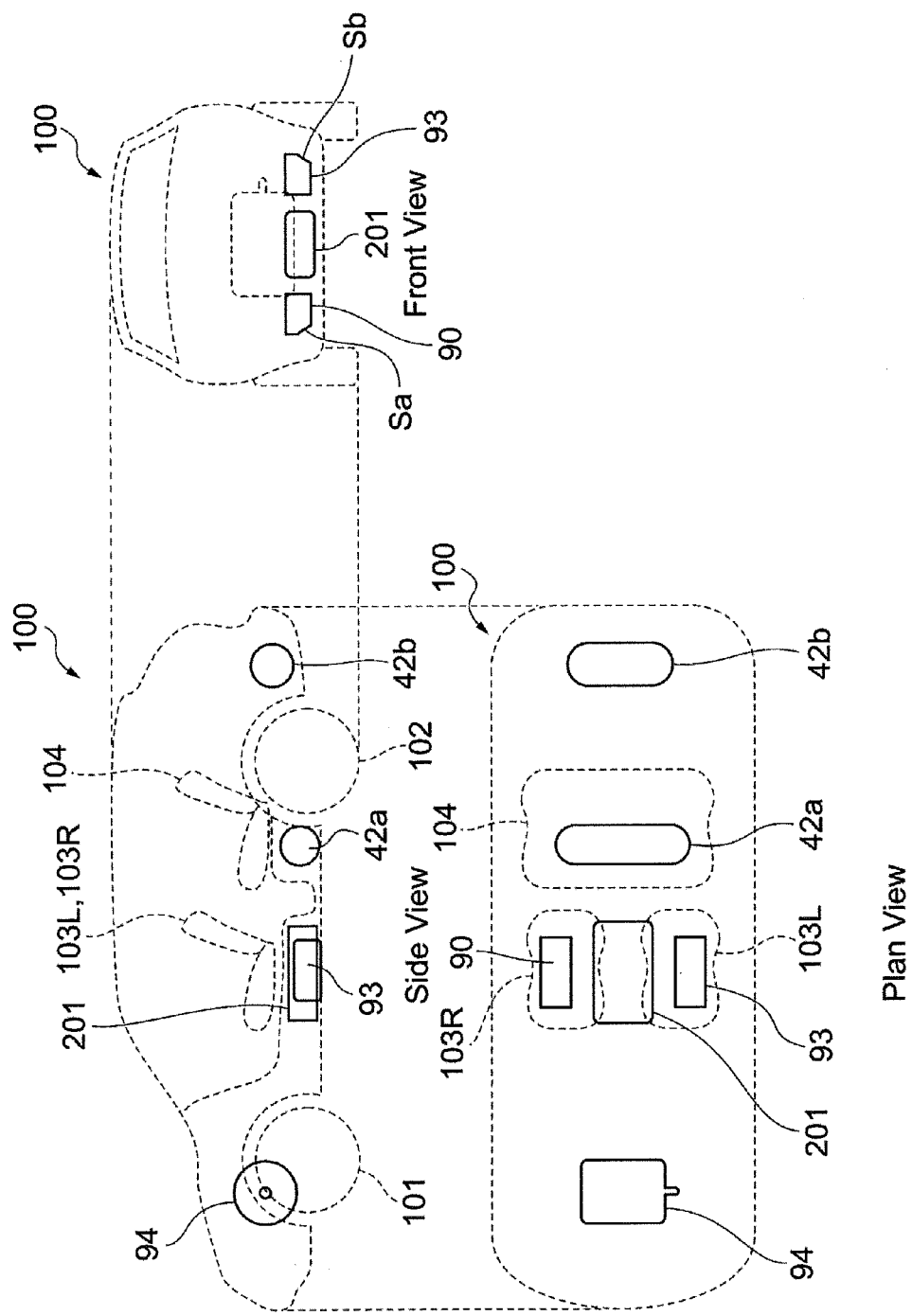

FUEL CELL SYSTEM AND VEHICLE

This is a 371 national phase application of PCT/JP2009/059774 filed 28 May 2009, the contents of which are incorporated herein by reference.

TECHNICAL FIELD

The present invention relates to a vehicle equipped with a fuel cell system, and particularly relates to a structure for providing a fuel cell and devices related to the fuel cell, such as a DC/DC converter.

BACKGROUND ART

A vehicle configured to drive by driving a vehicle-drive motor via the supply of power from a fuel cell system (hereinafter referred to as the "fuel cell vehicle") is being developed. In the fuel cell vehicle, members that configure the fuel cell system are arranged at the center part of the vehicle and below the floor, thereby ensuring safety during a collision.

For example, WO2003/104010 discloses a fuel cell vehicle in which: a fuel cell is arranged in an area below a front seat; and some of auxiliary apparatuses of the fuel cell are contained inside a center tunnel between right and left front seats (Patent Literature 1).

JP2007-15616 A discloses a fuel cell vehicle in which a fuel cell stack as well as an air discharge auxiliary apparatus and a hydrogen supply auxiliary apparatus, which are auxiliary apparatuses of a fuel cell, are contained in a center tunnel so as to be aligned in the front-back direction of the vehicle, the center tunnel being formed below a center console that extends in the front-back direction (Patent Literature 2).

JP2007-015612 A discloses a frame structure comprising: a pair of right and left center frames provided to support a center console; and a pair of right and left side frames provided outside the center frames with respect to the vehicle width direction. The publication also discloses that a fuel cell stack is contained in the center console and that a DC-DC converter is stored in an area in the vehicle width direction between the center frames and the side frames (Patent Literature 3).

A DC-DC converter that increases or decreases an output voltage of a fuel cell is disclosed in, for example, JP2007-209161 A and JP2007-318938 A (Patent Literatures 4 and 5).

CITATION LIST

Patent Literatures

Patent Literature 1: WO2003/104010
Patent Literature 2: JP2007-15616 A
Patent Literature 3: JP2007-015612 A
Patent Literature 4: JP2007-209161 A
Patent Literature 5: JP2007-318938 A

SUMMARY OF INVENTION

Technical Problem

However, in the providing structures in the prior art above, the safety of a fuel cell system is not ensured when the impact of a collision is applied to the fuel cell system. In order to secure the safety of the fuel cell system, apparatuses related to a fuel cell, such as a DC-DC converter, are required to be short-circuited in advance of the fuel cell, or the direction in which the collision impact is applied is required to be changed such that the impact is not applied directly to the fuel cell.

For example, the techniques described in Patent Documents 1 and 2 each disclose the arrangement of the auxiliary apparatuses of the fuel cell, but do not disclose the arrangement of the related apparatuses such as the DC-DC converter.

With the technique described in Patent Document 3, there has been a possibility that, when the impact of a collision from a side surface of a vehicle is high, the impact deforms the center frames, resulting in the destruction of the fuel cell stack, whereby fuel gas leaks from the fuel cell stack prior to a short-circuit of the converter.

Regarding the DC-DC converter described in each of Patent Documents 4 and 5, the DC-DC converter is a peripheral apparatus provided close to the fuel cell; therefore, there has been a possibility that, when the installation of the DC-DC converter is imperfect, the DC-DC converter collides with the fuel cell due to the impact during a collision of a vehicle, causing a leakage of fuel gas.

In order to deal with the inconvenience above, it is considered that a structure having extremely high rigidity is arranged between a fuel cell and the related apparatuses to enhance the impact resistance of the fuel cell. However, a vehicle with weight limits cannot employ any protective measure involving a rigid structure having an extremely heavy weight. The fuel cell is required to be protected effectively while suppressing the increase in weight of the vehicle.

In light of the above, an object of the present invention is to provide a fuel-cell-system providing structure that is capable of preventing a collision of a fuel cell with related apparatuses of the fuel cell while suppressing the increase in weight of a vehicle.

Solution to Problem

The present invention to solve the problems above provides a fuel cell system provided in a vehicle, including: a fuel cell unit in which a fuel cell is contained; and a related apparatus that is electrically connected to the fuel cell and that is located adjacent to the fuel cell unit, wherein the related apparatus is arranged at a position closer to an outer surface of the vehicle than the fuel cell unit.

With such a configuration, the related apparatus is arranged closer to the outer surface of the vehicle than the fuel cell unit, and thus, when the impact of a collision is applied to the vehicle from the outer surface, the impact is applied to the related apparatus in advance, thereby short-circuiting the electric system. Accordingly, in the event of a leakage of fuel gas from the fuel cell unit, the electric system has already been short-circuited, leading to the increased safety of the fuel cell system.

The invention may have the features below if desired.

(1) The vehicle may include a passenger compartment that is provided with a center bump portion, and the related apparatus may be arranged below the center bump portion.

With such a configuration, the related apparatus is arranged on the lower surface of the center bump portion as a dead space of the passenger compartment; therefore, the connection wiring of the related apparatus with respect to the fuel cell can be shortened while utilizing the space effectively.

(2) The related apparatus may be provided, at a part thereof close to the outer surface of the vehicle, with an inclined portion.

With such a configuration, when the impact of a collision is applied to the vehicle from the outer surface, the direction of the impact is changed by the inclined portion. Therefore, the impact can be prevented from being applied to the fuel cell, and the impact applied to the related apparatus itself can be alleviated.

(3) The inclined portion may be formed by a partial shape of a housing of the related apparatus.

With such a configuration, the shape of the related apparatus can alleviate the impact of a collision, and other members do not need to be used.

(4) The inclined portion may be formed by an impact suppressing member that is attached to the related apparatus.

With such a configuration, the impact suppressing member attached to the related apparatus can alleviate the impact of a collision, and the related apparatus does not need to be formed into a special shape.

(5) The related apparatus may be arranged on an inclined surface.

With such a configuration, the related apparatus moves from the inclined surface in the inclination direction but does not move in the direction of the fuel cell unit. Therefore, it is possible to prevent the related apparatus from directly being brought into contact with the fuel cell unit.

(6) The fuel cell unit may have a branch shape of two-direction branches, and the related apparatus may be arranged between the branches of the branch shape of the fuel cell unit.

With such a configuration, when the related apparatus slightly moves upon receiving the impact of a collision, the related apparatus does not directly make contact with the fuel cell unit and does not break the fuel cell unit, since the related apparatus is arranged between the branches of the branch shape of the fuel cell unit.

(7) One or both of the related apparatus and the branch shape of the fuel cell unit may be provided, at a part(s) thereof where the related apparatus and the fuel cell face each other, with a cushioning member(s).

With such a configuration, in the event of contact between the related apparatus and the fuel cell unit, the impact of a collision can be alleviated by the cushioning member(s).

Advantageous Effects of Invention

According to the present invention, the related apparatus is arranged closer to the outer surface of the vehicle than the fuel cell unit, and thus, when the impact of a collision is applied to the vehicle from the outer surface, the impact is applied to the related apparatus in advance, thereby short-circuiting the electric system, leading to the increased safety of the fuel cell system.

BRIEF DESCRIPTION OF DRAWINGS

FIG. 11 is a plan view illustrating the positional relationship between a DC-DC converter and a fuel cell unit in embodiment 3, wherein

FIG. 12 is a front view of a vehicle which illustrates the arrangement of a fuel cell and the related apparatuses in embodiment 4.

DESCRIPTION OF EMBODIMENTS

Figure 1:
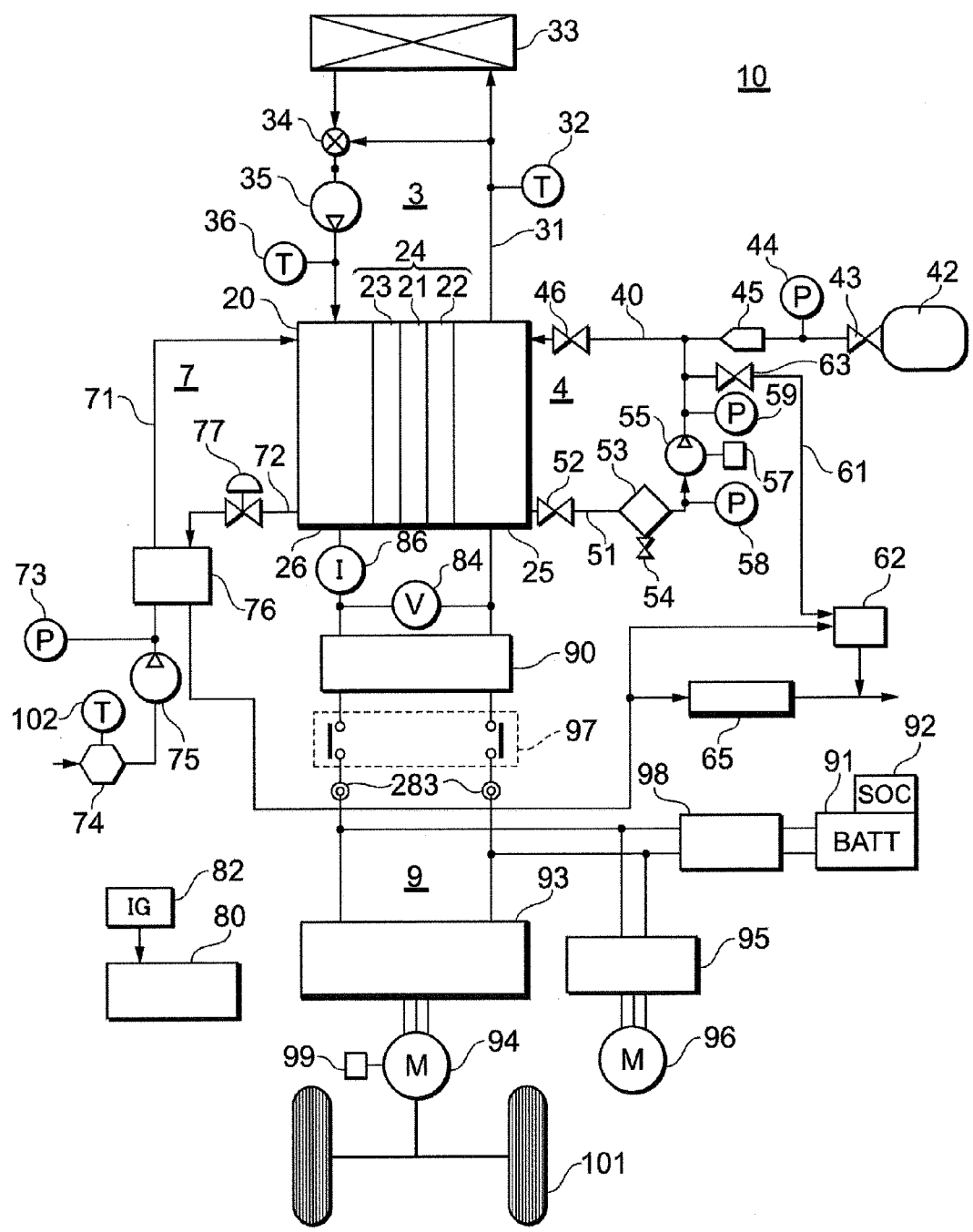
FIG. 1 is a system configuration diagram of a fuel cell system according to an embodiment of the invention.

Next, preferred embodiments for carrying out the present invention will be described with reference to the attached drawings.

In the drawings, the same or like parts are designated by the same or like reference numerals. However, the drawings are schematic, and thus the specific dimensions, etc., should be determined in light of the descriptions below. In addition, it should be apparent that the dimensional relationships and proportions between some parts differ in the drawings.

DEFINITION OF THE INVENTION

The terms used in the invention are defined as shown below.

"Vehicle": The term "vehicle" refers to a structure that is movable utilizing power generated from a fuel cell, and the movement principle is not considered. In the embodiments, the "vehicle" particularly refers to forms that move via the action of force on a traveling surface (vehicles and trains), but do not exclude other mobile forms. For example, forms that move via the action of force on a medium (airplanes, ships, submarines, etc.) are included. In addition, whether a vehicle is under attended control or unattended control is not considered.

"Front": The term "front" refers to a side to which a vehicle travels when a gear shift is moved into drive (driving), and is also termed the "front direction" or "front side."

"Rear": The term "rear" refers to a direction in which a vehicle travels when a gear shift is moved into reverse (back), and is also termed the "rear direction" or "rear side."

"Transverse": The term "lateral" refers to a lateral direction in a horizontal plane with respect to the above front direction or rear direction, and is also termed the "lateral direction" or "width direction."

"Upper": The term "upper" refers to a direction perpendicular to the traveling surface of a vehicle (also referred to as the "height direction") (The upper direction in the side view and front view in FIG. 2) is termed the "upper diction" or "upper side," and a downward direction (the direction of the road surface for the vehicle 100, the lower direction in the side view and front view in FIG. 2) is termed the "lower direction" or "lower side."

"Related apparatus": The term "related apparatus" refers to components, other than a fuel cell, which configure a fuel cell system, and the type is not considered. The "related apparatus" encompasses a converter, auxiliary-apparatus inverter, vehicle-drive inverter, cooling pump, drive pump, compressor, battery, etc.

"Adjacent": The term "adjacent" refers to a close distance between a fuel cell and a related apparatus, but no limitation is put on the distance. Note, however, that the distance may cause the related apparatus to have a physical influence on the fuel cell when the impact of a collision is applied to a vehicle without utilizing the present invention.

"Outer surface of a vehicle": The term "outer surface of a vehicle" encompasses the front surface and rear surface as the outer surfaces in the front-back direction of a vehicle, and the right side surface and left side surface as the outer surfaces in the vehicle width direction of the vehicle.

"Position close to an outer surface of a vehicle": The term "position close to an outer surface of a vehicle" refers to the distance in a planar view between the geometrical center of a fuel cell unit or related apparatus and an outer surface of a vehicle. When the vehicle has a plurality of outer surfaces, the distance between one of the outer surfaces and the geometrical center is referred to.

Embodiment 1

Embodiment 1 of the present invention relates to a fuel cell vehicle in which a DC-DC converter as a related apparatus is arranged closer to the front surface (one form of an outer surface) of the vehicle than a fuel cell unit. First, the configuration of a fuel cell system will hereinafter be described, and then the individual components will be described in detail.

(System Configuration)

FIG. 1 is a configuration diagram of a fuel cell system to which the invention has been applied.

A fuel cell system 10 in FIG. 1 is constituted by a fuel gas supply system 4, an oxidant gas supply system 7, a coolant supply system 3 and a power system 9. The fuel gas supply system 4 is a system for supplying a fuel gas (hydrogen gas) to a fuel cell 20. The oxidant gas supply system 7 is a system for supplying an oxidant gas (air) to the fuel cell 20. The coolant supply system 3 is a system for cooling the fuel cell 20. The power system 9 is a system for charging and discharging electric power generated from the fuel cell 20.

The fuel cell 20 includes a membrane electrode assembly (MEA) 24 in which an anode 22 and a cathode 23 are formed, through, e.g., screen printing, on both the surfaces of a polymer electrolyte membrane 21 constituted by, e.g., a proton conducting ion-exchange membrane formed of, e.g., fluororesin. The membrane electrode assembly 24 is sandwiched, on both of its sides, by separators (not shown) having flow paths for the fuel gas, oxidant gas and coolant. A groove-like anode gas channel 25 and a groove-like cathode gas channel 26 are respectively formed between one of the separators and the anode 22 and between the other separator and the cathode 23. The anode 22 is formed by providing a fuel electrode catalyst layer on a porous support layer, and the cathode 23 is formed by providing an air electrode catalyst layer on a porous support layer. The catalyst layers of these electrodes each are formed by, e.g., a deposition of platinum particles. In the fuel cell 20, the electrochemical reactions represented by formulae (1) to (3) below occurs.

$$H_2 \rightarrow 2H^+ + 2e^- \quad (1)$$

$$(½)O_2 + 2H^+ + 2e^- \rightarrow H_2O \quad (2)$$

$$H_2 + (½)O_2 \rightarrow H_2O \quad (3)$$

The reaction represented by formula (1) occurs at the anode 22, and the reaction represented by formula (2) occurs at the cathode 23. The reaction represented by formula (3) occurs in the entire fuel cell 20. In order to cause such electrochemical reactions, the fuel cell 20 is contained in a housing as described later, and is provided, in the form of a fuel cell unit, in a vehicle.

For the sake of convenience, FIG. 1 schematically illustrates the configuration of the unit cell constituted by the membrane electrode assembly 24, the anode gas channel 25 and the cathode gas channel 26. However, a stack structure in which plural unit cells (cell group) are connected in series via the above-described separators is actually provided.

The coolant supply system 3 in the fuel cell system 10 includes a cooling path 31, temperature sensors 32 and 36, a radiator 33, a valve 34 and a coolant pump 35. The cooling path 31 is a flow path for circulating a coolant. The temperature sensor 32 is a temperature detector for detecting the temperature of the coolant drained from the fuel cell 20. The radiator 33 is a heat exchanger for radiating heat of the coolant to the outside. The valve 34 is a valve device for adjusting the amount of the coolant flowing into the radiator 33. The coolant pump 35 is a driver for pressurizing the coolant via a motor (not shown) to circulate the coolant. The temperature sensor 36 is a temperature detector for detecting the temperature of the coolant supplied to the fuel cell 20.

The fuel gas supply system 4 in the fuel cell system 10 includes a fuel gas supply device 42, a fuel gas supply path 40 and a circulation path 51. The fuel gas supply device 42 is a storage device for storing the fuel gas (anode gas), e.g., hydrogen gas. The fuel gas supply path 40 is a flow path device for supplying the fuel gas from the fuel gas supply device 42 to the anode gas channel 25. The circulation path 51 is a flow path device (circulation path) for circulating, in the fuel gas supply path 40, the fuel-off gas exhausted from the anode gas channel 25.

The fuel gas supply device 42 is constituted by, for example, a high-pressure hydrogen tank, hydrogen absorbing alloys and a reformer. In this embodiment, the fuel gas supply device 42 includes a first fuel gas tank 42a and a second fuel gas tank 42b. Arranged in the fuel gas flow path 40 are a main valve 43, a pressure sensor 44, an ejector 45 and a cutoff valve 46. The main valve 43 is a cutoff valve for controlling the outflow of the fuel gas from the fuel gas supply device 42. The pressure sensor 44 is a pressure detector for detecting the relatively high pressure of the fuel gas in the conduit that is downstream of the main valve 43 and is upstream of the ejector 45. The ejector 45 is an adjustment valve for adjusting the pressure of the fuel gas inside the circulation path 51. The cutoff valve 46 is a valve device for controlling the presence and absence of the supply of the fuel gas to the fuel cell 20.

The circulation path 51 includes a cutoff valve 52, a gas-liquid separator 53, a discharge valve 54 and a hydrogen pump 55. The cutoff valve 52 is a valve device for controlling the presence and absence of the supply of the fuel-off gas from the fuel cell 20 to the circulation path 51. The gas-liquid separator 53 is a separator for removing water contained in the fuel-off gas. The discharge valve 54 is a valve device for discharging the water separated by the gas-liquid separator 53 to the outside. The hydrogen pump 55 includes a motor (not shown) and is a driver being a forced circulation device for compressing the fuel-off gas which has suffered pressure loss when the fuel-off gas passes the anode gas channel 25 to boost the pressure to an appropriate gas pressure and returning the resultant fuel-off gas to the fuel gas flow path 40. Via the drive of the hydrogen pump 55, the fuel-off gas merges with the fuel gas supplied from the fuel gas supply device 42 at the point of merge between the fuel gas supply path 40 and the circulation path 51, and then is supplied to the fuel cell 20 to be reused. Note that the hydrogen pump 55 is provided with: a revolution speed sensor 57 for detecting the revolution speed of the hydrogen pump 55; and pressure sensors 58 and 59 for detecting the pressures in the circulation path in front of and behind the hydrogen pump 55.

Further, an exhaust flow path 61 is arranged to branch off from the circulation flow path 51. The exhaust flow path 61 is provided with a purge valve 63 and a diluter 62, and is an exhauster for exhausting the fuel-off gas exhausted from the fuel cell 20 to the outside of the vehicle. The purge valve 63 is a valve device for controlling the exhaust of the fuel-off gas. Circulation in the fuel cell 20 is repeated with the opening and closing of the purge valve 63, thereby discharging the fuel-off gas, the impurity concentration of which has been increased, to the outside while introducing a new fuel gas, so that the reduction of a cell voltage can be prevented. The diluter 62 is a diluter for diluting the fuel-off gas with the oxidant-off gas to attain a concentration that does not cause any oxidation reaction, and is, e.g., a hydrogen-concentration reduction device.

Meanwhile, an oxidant gas supply path 71 and an oxidant-off gas discharge path 72 are arranged in the oxidant gas supply system 7 of the fuel cell system 10. The oxidant gas supply path 71 is a flow path device for supplying the oxidant gas (cathode gas) to the cathode gas channel 26. The oxidant-off gas discharge path 72 is a flow path device for exhausting the oxidant-off gas (cathode-off gas) exhausted from the cathode gas channel 26.

The oxidant gas supply path 71 is provided with an air cleaner 74 and an air compressor 75. The air cleaner 74 is a taking-in and filtering device for taking in air from the atmosphere to filter the air and supplying the filtered air to the oxidant gas supply path 71. The air compressor 75 is a driver for compressing the taken-in air via a motor (not shown) and sending the compressed air, as the oxidant gas, to the cathode gas channel 26. A pressure sensor 73 for detecting the pressure of the air supplied from the air compressor 75 is provided to the air compressor 75.

A humidifier 76 is provided between the oxidant gas supply path 71 and the oxidant-off gas discharge path 72. The humidifier 76 exchanges humidity between the oxidant gas supply path 71 and the oxidant-off gas discharge path 72, and increases the humidity in the oxidant gas supply path 71.

The oxidant-off gas discharge path 72 is provided with a pressure regulating valve 77 and a muffler 65. The pressure regulating valve 77 is a pressure regulator that functions as a regulator for adjusting the exhaust pressure of the oxidant-off gas discharge path 72. The muffler 65 is a silencer for absorbing the exhaust sound of the oxidant-off gas. The oxidant-off gas exhausted from the pressure regulating valve 77 is divided. One of the resultant flows of the divided oxidant-off gas flows into the diluter 62, and is diluted by being mixed with the fuel-off gas remaining in the diluter 62, whereas the other flow of the divided oxidant-off gas is subjected to sound absorption by the muffler 65, and is mixed with the gas, which has been subjected to dilution via mixture by the diluter 62, so as to be exhausted to the outside of the vehicle.

Connected to the power system 9 in the fuel cell system 10 are a voltage sensor 84, a current sensor 86, a fuel-cell DC-DC converter 90, a battery 91, a battery computer 92, an inverter 93, a vehicle-drive motor 94, an inverter 95, high-voltage auxiliary apparatuses 96, a relay 97 and a battery DC-DC converter 98. These are the "related apparatuses" in this embodiment.

The fuel cell DC-DC converter (hereinafter referred to as the "FC converter") 90 is a voltage converter for performing voltage conversion between the primary side terminals and the secondary side terminals. More specifically, the output terminals of the fuel cell 20 are connected to the primary side terminals of the FC converter 90, and the inverter 93 is connected to the secondary side terminals thereof. The battery DC-DC converter (hereinafter referred to as the "battery converter") 98 is also a voltage converter that performs voltage conversion between the primary side terminals and the secondary side terminals. More specifically, the primary side terminals of the battery converter 98 are connected to the output terminals of the battery 91, and the secondary side terminals thereof are connected to the input terminals of the inverter 93. The battery converter 98 is connected in parallel to the FC converter 90.

The FC converter 90 increases the output voltage of the fuel cell 20 connected to the primary side terminals, and supplies the resultant voltage to the input terminals of the inverter 93 connected to the secondary side terminals. When the power generated by the fuel cell 20 is insufficient, the battery converter 98 increases the output voltage of the battery 91 connected to the primary side terminals, and supplies the resultant voltage to the input terminals of the inverter 93 connected to the secondary side terminals. Further, when surplus power is generated in the fuel cell 20, the battery 91 is charged with the surplus power of the fuel cell 20 via the FC converter 90 and the battery converter 98. Further, when regenerative power is generated through a braking operation on the vehicle-drive motor 94, the battery 91 is charged with the regenerative power via the battery converter 98.

The FC converter 90 includes the relay 97 at the secondary side terminals. The relay 97 keeps the conduction connection in a normal state. However, when a certain impact is applied to the FC converter 90, the relay 97 is brought into a cutoff state, so that the secondary side terminals of the FC converter 90 are electrically separated from the inverter 93, the inverter 95 and the battery converter 98.

Further, the secondary side terminals of the FC converter 90 are electrically connected to the input terminals of the inverters 93 and 95 and the secondary side terminals of the battery converter 98 via a power plug 283 described below.

The battery 91 is a power storage device that serves as a secondary battery and that is charged with surplus power and regenerative power. The battery computer 92 is a monitor for monitoring the charge status of the battery 91. The inverter 93 is a dc/ac converter for converting DC currents supplied via the FC converter 90 or the battery converter 98 into three-phase AC currents so as to supply the three-phase AC currents to the vehicle-drive motor 94 serving as a target of drive. The vehicle-drive motor 94 is a main drive device of the fuel cell vehicle, and is a driver that is driven by the three-phase AC currents from the inverter 93. The inverter 95 is a DC/AC converter for supplying AC power to the various high-voltage auxiliary apparatuses 96 that constitute the fuel cell system 10. The high-voltage auxiliary apparatuses 96 refer to a generic name for drivers that utilize motors other than the vehicle-drive motor 94. More specifically, the high-voltage auxiliary apparatuses 96 refer to motors such as the coolant pump 35, the hydrogen pump 55 and the air compressor 75.

The voltage sensor 84 is a voltage detector for measuring the output voltage of the fuel cell 20, and the current sensor 86 is a current detector for measuring the output current of the fuel cell 20. The voltage sensor 84 and the current sensor 86 are used to respectively detect the output voltage and the output current of the fuel cell 20.

Note that the vehicle-drive motor 94 is provided with a revolution speed sensor 99 for detecting the revolution speed of the vehicle-drive motor 94. Front tires 101 being vehicle wheels are mechanically connected to the vehicle-drive motor 94 via a differential, which enables the rotation force of the vehicle-drive motor 94 to be converted into an impelling force of the vehicle.

Further, arranged in the fuel cell system 10 is a controller 80 for controlling the entire power generation of the fuel cell system 10. The controller 80 is constituted by a general-use computer (not shown) which is provided with, for example, a CPU (central processing unit), RAM, ROM and an interface circuit. The controller 80 may be constituted by a single computer, or may be constituted by a plurality of co-operating computers. The controller 80 carries out, for example, the control below, but is not limited to that control.

(1) Receiving an input of a switch signal from an ignition switch 82 to start or stop the fuel cell system 10;

(2) taking in detection signals of a gas peddle (not shown) and shift position (not shown) and a revolution speed signal from the revolution speed sensor 99 to compute control parameters such as system-request power being the amount of supply of required power;

(3) controlling the resolution speed of the air compressor 75 so as to attain an appropriate amount of supply of the oxidant gas to the oxidant gas supply path 71 based on the relative pressure value of the oxidant gas supply path 71 which is detected by the pressure sensor 73;

(4) controlling the opening degree of the pressure regulating valve 77 so as to attain an appropriate amount of the oxidant-off gas exhausted to the oxidant-off gas discharge path 72;

(5) adjusting the opening degree of the main valve 43 or the adjusted pressure of the ejector 45 so as to attain an appropriate amount of supply of the oxidant gas supplied to the fuel gas supply path 40 based on the relative pressure values detected by the pressure sensors 44, 58 and 59;

(6) controlling the revolution speed of the hydrogen pump 55 or controlling the opening degree of the purge valve 63 so as to attain an appropriate amount of the oxidant-off gas that circulates through the circulation path 51 while monitoring the value of the revolution speed sensor 57;

(7) controlling the opening and closing of the main valve 43, the cutoff valve 46, the cutoff valve 52, etc., in accordance with the operation mode;

(8) computing the amount of circulation of the coolant based on the relative temperatures of the coolant detected by the temperature sensors 32 and 36 to control the revolution speed of the coolant pump 35;

(9) calculating the AC impedance of the fuel cell 20 based on the voltage value detected by the voltage sensor 84 and the current value detected by the current sensor 86 and performing speculative computation of the water amount of the electrolyte membrane to control the amount of scavenging as of, e.g., when the vehicle is stopped; and

(10) controlling the power system 9, e.g., the FC converter 90, the battery converter 98, the inverters 93 and 95, the vehicle-drive motor 94 and the high-voltage auxiliary apparatuses 96.

(Arrangement of Fuel Cell System in Vehicle)

Figure 2:
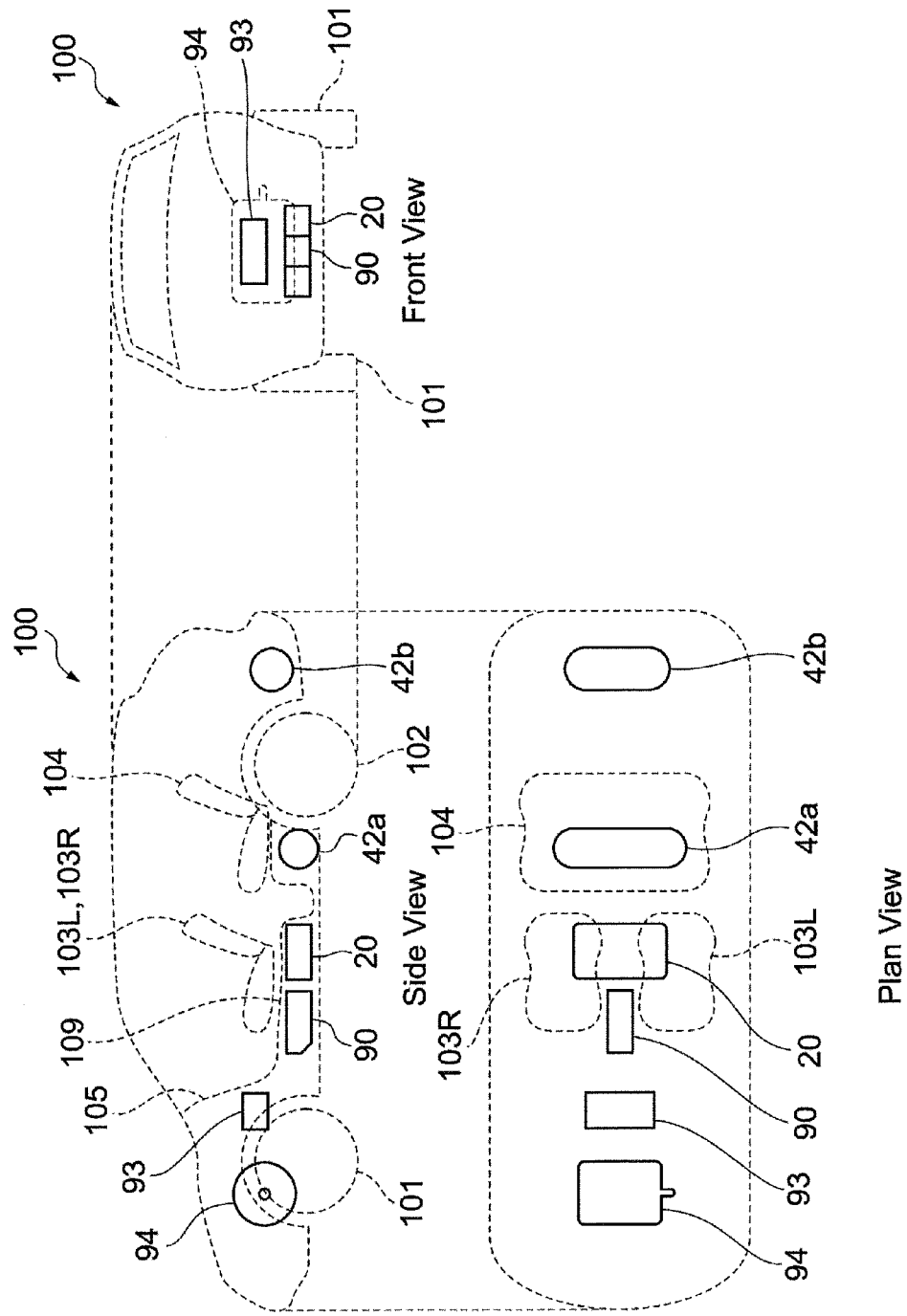
FIG. 2 shows a side view, plan view and front view that illustrate the arrangement of a fuel cell and the related apparatuses in a vehicle according to embodiment 1.

Next, the configuration of the fuel cell vehicle in embodiment 1 will be described with reference to FIGS. 2 to 7. FIG. 2 illustrates the arrangement of the fuel cell 20 and the related apparatuses in the fuel cell vehicle in embodiment 1. FIG. 2 includes the side view, the plan view and the front view.

As shown in the side view and plan view in FIG. 2, the outer shapes of a vehicle 100, the front tire 101, a rear tire 102, front seats 103 (103R and 103L) and a rear seat 104 are indicated by broken lines. The broken lines that form the contour of the vehicle 100 indicate the "outer surface" of the fuel cell vehicle. As shown in the side view in FIG. 2, a dashboard 105, which defines a passenger compartment, into which passengers climb, is indicated by bold broken lines. The outer shapes of the components of the fuel cell system 10 are indicated by solid lines. FIG. 2 illustrates the arrangement of the fuel cell 20, the FC converter 90, the inverter 93, the vehicle-drive motor 94 and the first fuel gas tank 42a among the components of the fuel cell system 10.

As shown in FIG. 2, the vehicle-drive motor 94, the inverter 93, the FC converter 90 and the fuel cell 20 are arranged from the front side to the rear side of the vehicle 100.

As shown in the side view in FIG. 2, the fuel cell 20 and the FC converter 90 are arranged on the lower part (the bottom surface) of the vehicle 100 which is defined by the dashboard 105. In a planar view, the fuel cell 20 is arranged substantially at the center of the vehicle in the right-left direction and in the front-back direction of the vehicle and directly below the front seat 103. The FC converter 90 is arranged adjacent to the fuel cell 20 and in front of the fuel cell 20, because the output terminals of the fuel cell 20 are directly connected to the FC converter 90. That is, the FC converter 90 is arranged at a position closer to the front surface, which is one of the outer surfaces of the vehicle 100, than the fuel cell 20. In order to obtain wider legroom for passengers, the dashboard 105 is provided with a tunnel portion 109, between the right front seat 103R and the left front seat 103L, which is raised in the front-back direction. The tunnel portion 109 corresponds to the "center bump portion" in the invention. The FC converter 90 is contained in the tunnel portion 109.

Figure 4:
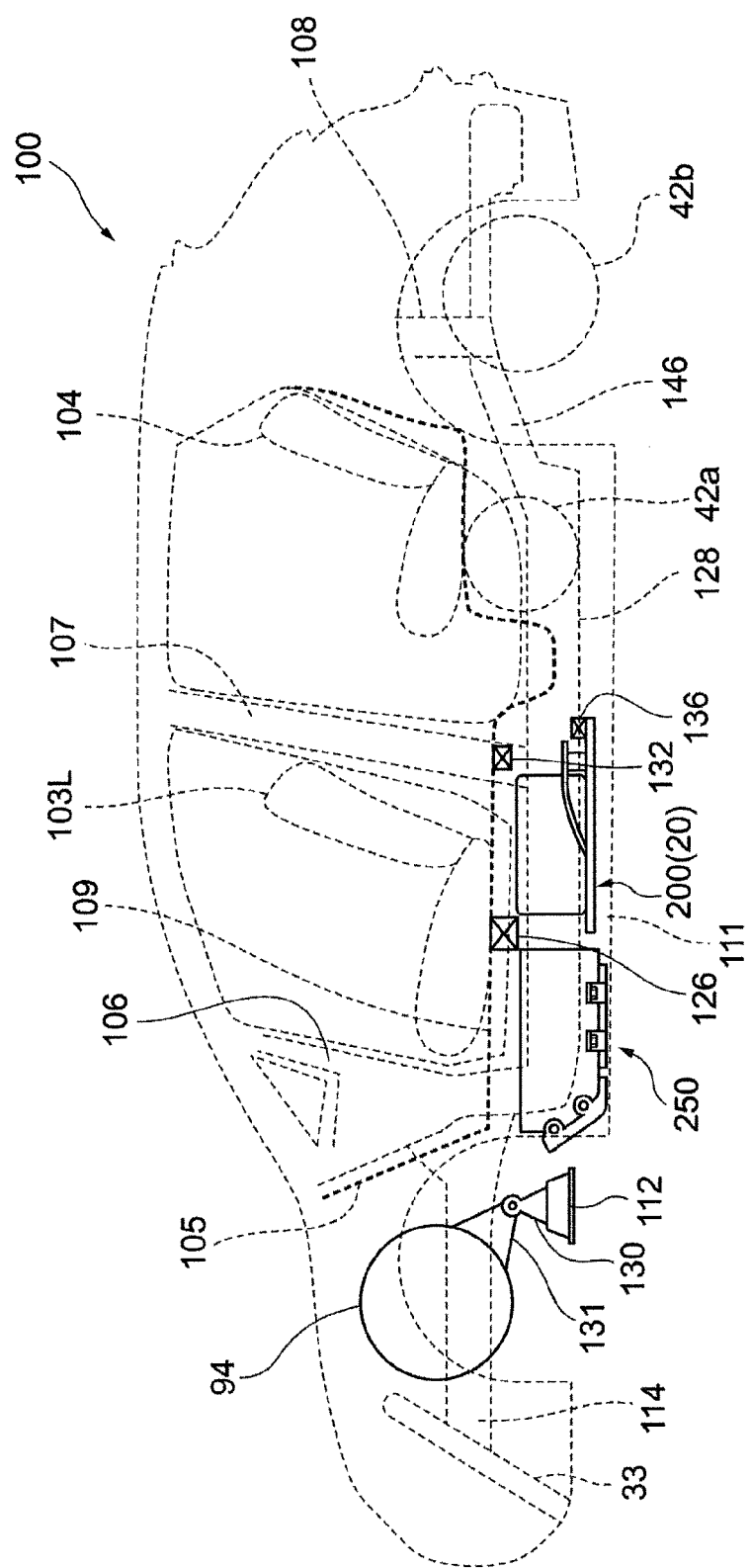
FIG. 4 is a side view of the vehicle which illustrates the arrangement of the fuel cell and the related apparatuses in embodiment 1.

The vehicle-drive motor 94 is arranged in the vicinity of the front tire 101 and at the front part of the vehicle 100 in order to drive the front tire 101. As shown in FIG. 4, the vehicle-drive motor 94 is, via attaching rubber 131, fastened to a motor mount 130 provided to a front suspension member 112. The inverter 93 is arranged directly behind the vehicle-drive motor 94 and above the FC converter 90, to which the inverter 93 is connected in parallel, in order to allow power to be supplied to the vehicle-drive motor 94. The first fuel gas tank 42a is arranged behind the fuel cell 20 in order to supply the fuel gas to the fuel cell 20.

In this embodiment, as is apparent from FIG. 2, all of the fuel cell 20, the FC converter 90, the inverter 93 and the vehicle-drive motor 94 are arranged so as not to overlap one another when seen from in front of the vehicle. In other words, three or more apparatuses are not arranged in the same straight line. Such an arrangement avoids multiple collisions.

Further, the fuel cell 20 and the FC converter 90 are arranged, substantially at the center and in the lower portion of the vehicle 100, so as to be surrounded by frames (described below) extending in the front-back direction of the vehicle 100 and cross members (described below) extending in the width direction of the vehicle 100. Therefore, the fuel cell 20 and the FC converter 90 are arranged at positions where they are not broken easily due to a collision from in front of the vehicle 100 as well as a collision in the transverse direction. In particular, as described below, the FC converter 90 corresponds to the related apparatus of the invention, and includes an inclined portion at a part thereof close to the front of the vehicle 100, and therefore has extremely high resistance against the collision from the front direction.

Note that, in the descriptions below, the fuel cell 20 takes the forms of a fuel cell unit 201 contained in a housing and of a fuel cell assembly 200 integrated with a protective structure 220, and is arranged in the vehicle 100. Further, the FC converter 90 takes the form of a converter assembly 250 integrated with a protective structure 260, and is arranged in the vehicle 100.

(Vehicle Structure)

Figure 3:
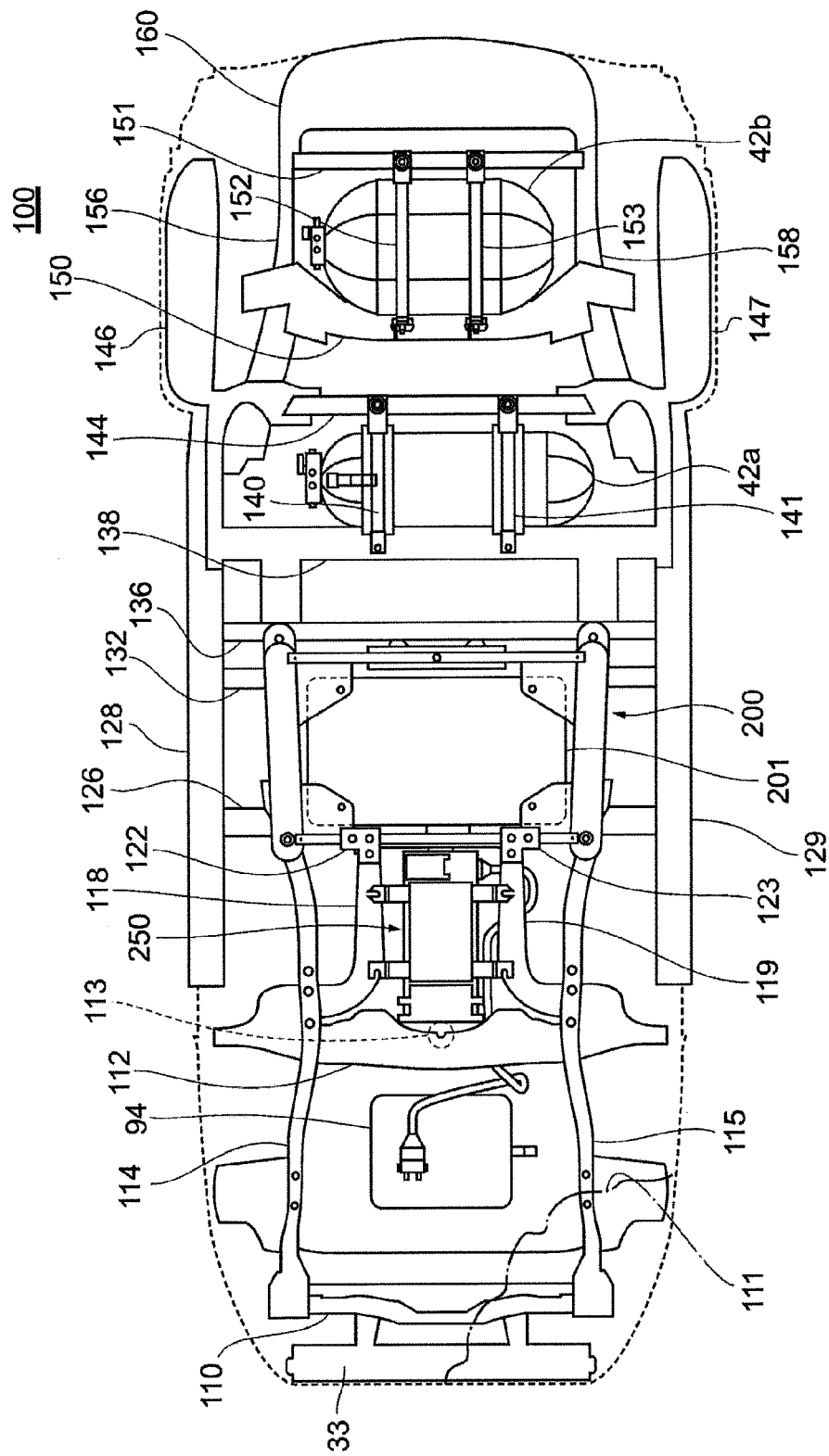
FIG. 3 is a bottom view of the vehicle which illustrates the arrangement of the fuel cell and the related apparatuses in embodiment 1.

FIG. 3 is a vehicle bottom view including the structure of the vehicle 100 and the arrangement of the fuel cell and the related apparatuses in embodiment 1.

It is assumed that various members such as frames, members and pillars described below are formed of a metal material having constant rigidity, e.g., aluminum, SUS or iron. The metal material can be selected arbitrarily in terms of the easiness of processing, strength, resistance, weight, cost, etc. The metal material may be subjected to known hardening processing, e.g., quenching or alloying.

As shown in FIG. 3, a floor panel 111 is provided on the entire bottom surface of the vehicle 100. In the front part of the vehicle 100, front frames 114 and 115 are provided, at the bottom, to extend in the front-back direction of the vehicle 100, and form a skeleton structure of the front part of the vehicle 100. A front cross member 110 is provided, in the width direction of the vehicle, at the forward ends of the front frames 114 and 115, and the radiator 33 shown in FIG. 1 is attached to the front cross member 110. The front suspension member 112 is provided, in the width direction of the vehicle, behind the front cross member 110. The front suspension member 112 is fastened to the front frames 114 and 115. The vehicle-drive motor 94, which is shown in FIGS. 1 and 2, is arranged in the area surrounded by the front cross member 110 and the front suspension member 112.

The fuel cell assembly 200 is an assembly structure including the fuel cell 20, and will be described in detail with reference to FIG. 5. The fuel cell assembly 200 is fastened to the front frames 114 and 115 in the front part of the vehicle, and is fastened, in the rear part of the vehicle, to a third cross member 136 provided in the vehicle width direction. As shown in FIG. 3, a pair of sub-frames 118 and 119 extends in the vehicle front-back direction from behind the positions, where the front suspension member 112 is fastened to the front frames 114 and 115, to the fuel cell assembly 200. Ends of the sub-frames 118 and 119 are fastened to the fuel cell assembly 200 together with brackets 122 and 123. A converter assembly 250 is arranged between the pair of sub-frames 118 and 119. The converter assembly 250 is an assembly structure including the FC converter 90, and will be described in detail with reference to FIGS. 5 to 7. The converter assembly 250 is fastened to the sub-frames 118 and 119. Note that, in FIG. 5, the illustration of a panel provided on a back surface of the protective structure 220 is omitted.

In the center part of the vehicle 100, side locker members 128 and 129 are provided, on the side surfaces of the vehicle 100, so as to extend in the front-back direction of the vehicle 100. A first cross member 126, a second cross member 132 and a third cross member 136 are laid, in the width direction of the vehicle 100, between the side locker members 128 and 129 from the front side to the rear side to be fastened to the side locker members 128 and 129, thereby establishing a rigid structure in the vehicle center part with respect to impacts from the transverse direction. According to the invention, the fuel cell assembly 200 is arranged between the first cross member 126 and the third cross member 136 in the front-back direction, and between the front frame 114 and the front frame 115 in the width direction.

In the rear part of the vehicle 100, rear locker members 146 and 147 extend, in the front-back direction of the vehicle 100, from the rear parts of the side locker members 128 and 129 to the periphery of the rear tire 102. A fourth cross member 138, a fifth cross member 150 and a rear cross member 160 are laid, in the width direction of the vehicle 100, between the rear locker members 146 and 147 from the front side to the rear side to be fastened to the locker members 146 and 147, thereby establishing a resistive structure in the vehicle rear part with respect to impacts from the transverse direction. Behind the fourth cross member 138, a sub-cross member 144 is laid, in the width direction of the vehicle 100, between the rear locker members 146 and 147. The first fuel gas tank 42a is arranged between the fourth cross member 138 and the sub-cross member 144. Binders 140 and 141 are laid between the fourth cross member 138 and the sub-cross member 144 to fix the first fuel gas tank 42a. Behind the fifth cross member 150, a sub-cross member 151 is laid between the rear locker members 146 and 147. The second fuel gas tank 42b is arranged between the fifth cross member 150 and the sub-cross member 151. Binders 152 and 153, which are laid between the fifth cross member 150 and the sub-cross member 151, fixes the second fuel gas tank 42b.

Note that, in the above configuration, a notch deformation promoting portion 113 is provided in the center part of the front suspension member 112. When the impact of a collision from in front of the vehicle is applied to the vehicle, and then the front suspension member 112 is brought into contact with the converter assembly 250, the deformation promoting portion 113 is easily deformed and folded to absorb the energy. Therefore, this can prevent the converter assembly 250 from moving back further.

FIG. 4 is a side view of the vehicle which includes the arrangement of the converter assembly 250 in embodiment 1. As shown in FIG. 4, the vehicle-drive motor 94 is fastened, via the attaching rubber 131, to the motor mount 130 provided to the front suspension member 112. When the impact of a collision from in front of the vehicle is applied to the vehicle, the vehicle-drive motor 94 moves back, and the front suspension member 112 also moves back. However, the converter assembly 250 has the structure described below of the related apparatus of the invention, and thus is configured to protect the fuel cell assembly 200 against the impact of the collision. As described above with reference to FIG. 2, the fuel cell assembly 200 is arranged below the front seats 103L and 103R. The converter assembly 250 is arranged on the bottom surface side of the tunnel portion 109, which is between the front seats 103L and 103R and is the center bump portion of the dashboard 105. A front pillar 106 is vertically arranged from the front part of the side locker member 128 (129), and a center pillar 107 is vertically arranged from the center part thereof. A rear pillar 108 is vertically arranged from the center part of the rear locker member 146. As described above with reference to FIG. 3, the side locker members 128 and 129 constitute the skeleton structure surrounding the converter assembly 250 and the fuel cell assembly 200 with the aid of the first cross member 126, the second cross member 132 and the third cross member 136.

Note, in the configuration above, any of the frames, members and pillars has a structure in which a metal sheet is provided with corrugation or a structure in which such metal sheets are combined. By employing either of the structures, light weight and high mechanical strength can be achieved.

(Structures of Fuel Cell Assembly 200 and of Converter Assembly 250)

Next, the structures of the fuel cell assembly 200 and the converter assembly 250 are described in detail. FIG. 5 is a perspective view of the fuel cell assembly 200 and the converter assembly 250 in embodiment 1.

Figure 5:
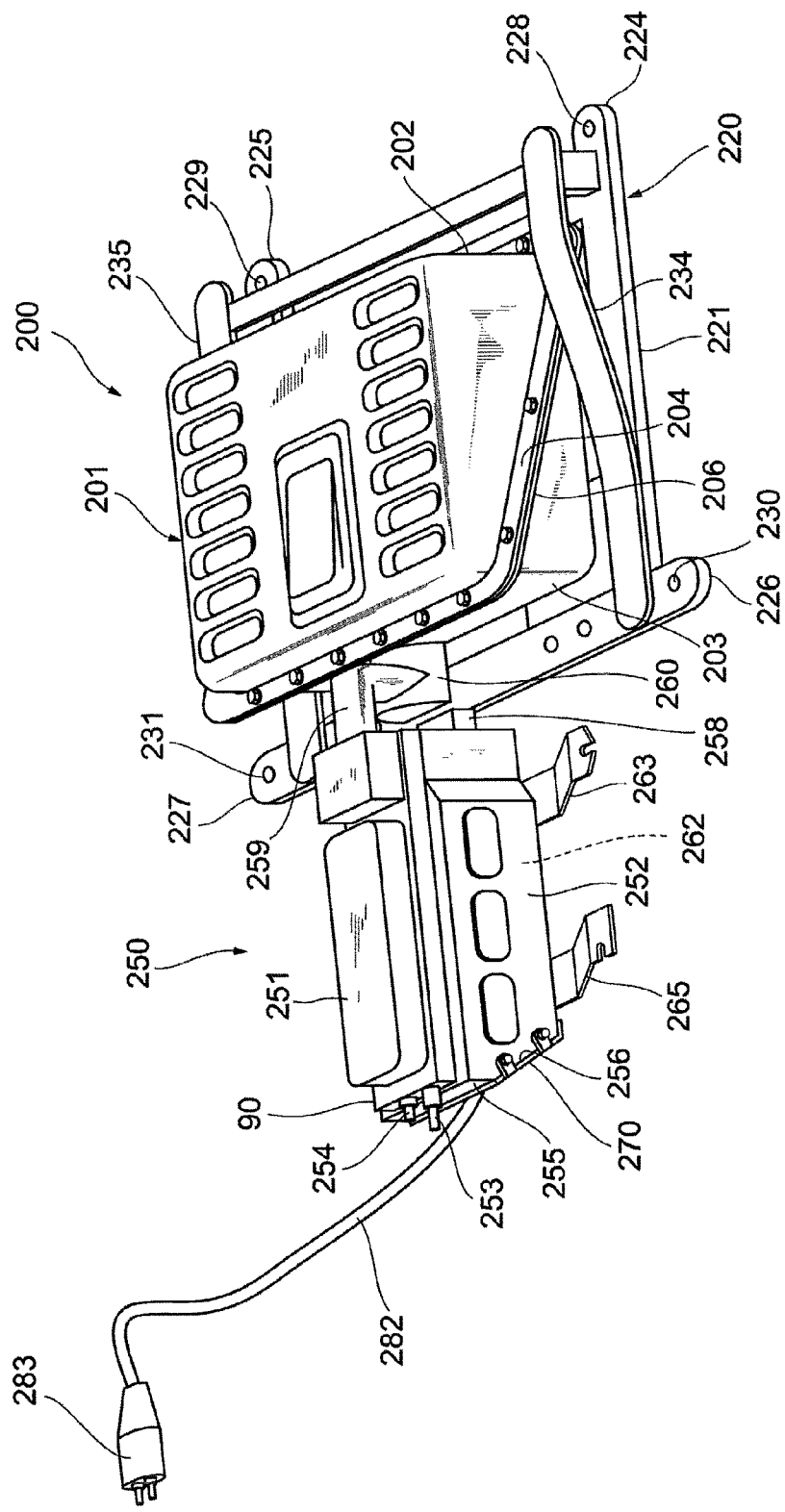
FIG. 5 is a perspective view of a fuel cell assembly and a converter assembly in embodiment 1.

As shown in FIG. 5, the fuel cell assembly 200 is configured such that the fuel cell unit 201 is mounted to the protective structure 220. The fuel cell unit 201 is constituted by an upper housing 202 and a lower housing 203 to contain the fuel cell 20. With the fuel cell 20 being interposed between the upper housing 202 and the lower housing 203, an upper flange 204 of the upper housing 202 and a lower flange 206 of the lower housing 203 are aligned and fastened to each other, thereby configuring the fuel cell unit 201. A terminal socket (not shown) is provided at a part, of the fuel cell unit 201, close to the front of the vehicle.

As shown in FIG. 5, the upper flange 204 and the lower flange 206 are inclined, at side surfaces thereof, with respect to the bottom surface or upper surface of the fuel cell unit 201. That is, the flanges are formed to cross obliquely the side surfaces of the fuel cell unit 201. The parts where the flanges are formed have, in general, increased mechanical strength. Therefore, the fuel cell unit 201 is configured such that, even if the impact of a collision is applied, at any heights of the side surfaces, to the side surfaces on which the upper flange 204 and the lower flange 206 are obliquely formed, the fuel cell unit 201 can withstand the impact.

As shown in FIG. 5, the protective structure 220 is formed to be one size larger than the bottom surface of the fuel cell unit 201 so as to surround the fuel cell unit 201. Arranged at corners formed by four side members that configure the protective structure 220 are mounting eyes (not shown) for fastening the fuel cell unit 201. An under panel (not shown) is attached to the backsides of the mounting eyes. A frame structure 221 is provided with inclined frames 234 and 235. Arranged at the corner portions, of the frame structure 221, close to the front of the vehicle are attaching portions 226 and 227, and the attaching portions 226 and 227 are formed with fastening holes 230 and 231, respectively. The attaching portions 226 and 227 on the vehicle front side are fastened to the front frames 114 and 115, respectively. More specifically, the fastening holes 230 and 231 provided in the attaching portions 226 and 227 and the fastening holes provided in the front frames 114 and 115 are fastened by fastening members (bolts, nuts, etc.). Provided at the ends, on the vehicle rear side, of the inclined frames 234 and 235 are attaching portions 224 and 225, and the attaching portions 224 and 225 are formed with fastening holes 228 and 229, respectively. The attaching portions 224 and 225 are fastened to the third cross member 136. More specifically, the fastening holes 228 and 229 provided in the attaching portions 224 and 225 and the fastening holes provided in the third cross member 136 are fastened by fastening members.

As shown in FIG. 5, the protective structure 220 has, at the positions that face the two side surfaces of the fuel cell unit 201, the inclined frames 234 and 235 provided obliquely with respect to the horizontal plane. Therefore, the fuel cell unit 201 is configured such that, even if the impact of a collision is applied, at any heights thereof, to the inclined frames 234 and 235, the fuel cell unit 201 can withstand the impact.

Further, as shown in FIG. 5, the fuel cell unit 201 is mounted to the protective structure 220 such that the inclination direction of the inclined frames 234 and 235 is opposite the inclination direction of the upper flange 204 and the lower flange 206 of the fuel cell unit 201. For example, in FIG. 5, the inclined frames 234 and 235 of the protective structure 220 are inclined to become higher from the vehicle front side to the vehicle rear side. Therefore, the fuel cell unit 201 is attached to the protective structure 220 such that the upper flange 204 and the lower flange 206 are lower from the vehicle front side to the vehicle rear side. The flanges of the fuel cell unit 201 and the inclined frames 234 and 235 of the protective structure 220 are combined in such an arrangement, whereby the mechanical strength can further be enhanced. This is because, when the fuel cell assembly 200 is seen from the side-surface direction, the flanges of the fuel cell unit 201 and the inclined frames of the protective structure 220 form a cross structure.

(Converter Assembly 250)

Figure 6:
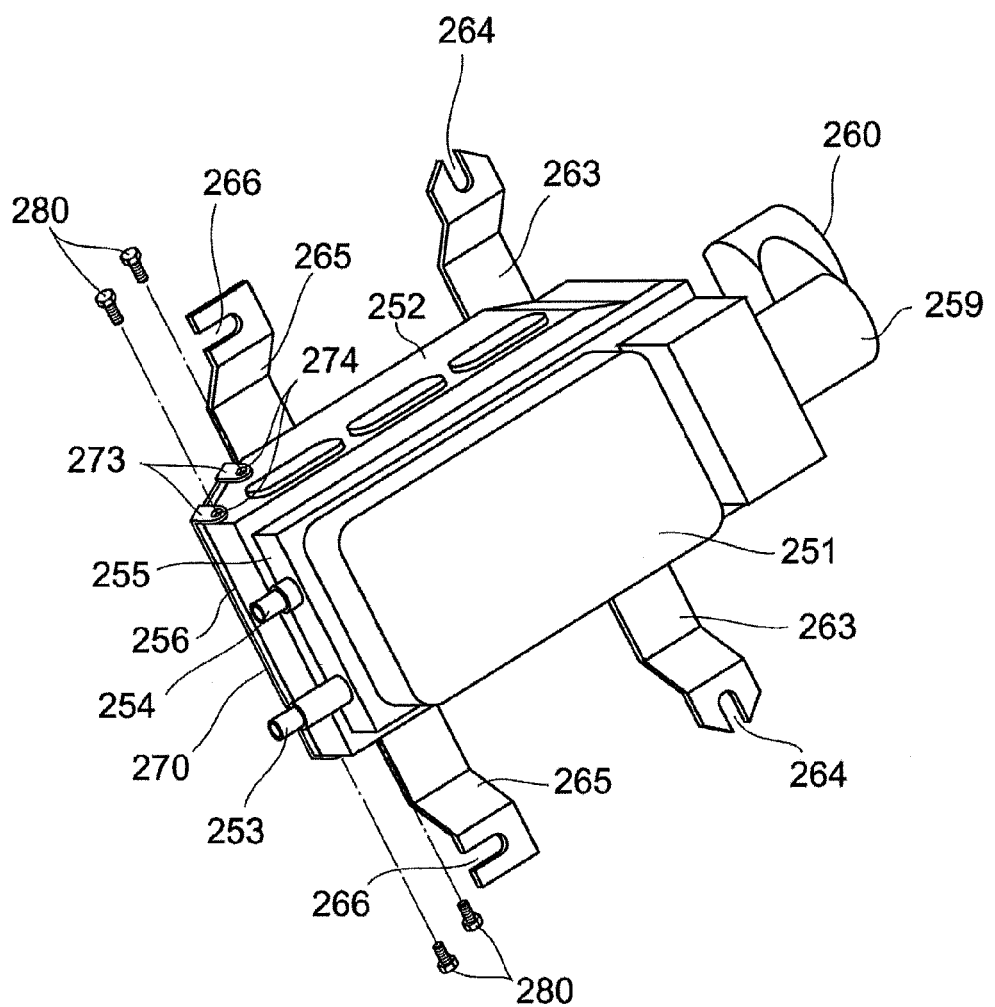
FIG. 6 is an upper-surface perspective view illustrating the configuration of the converter assembly in embodiment 1.
Figure 7:
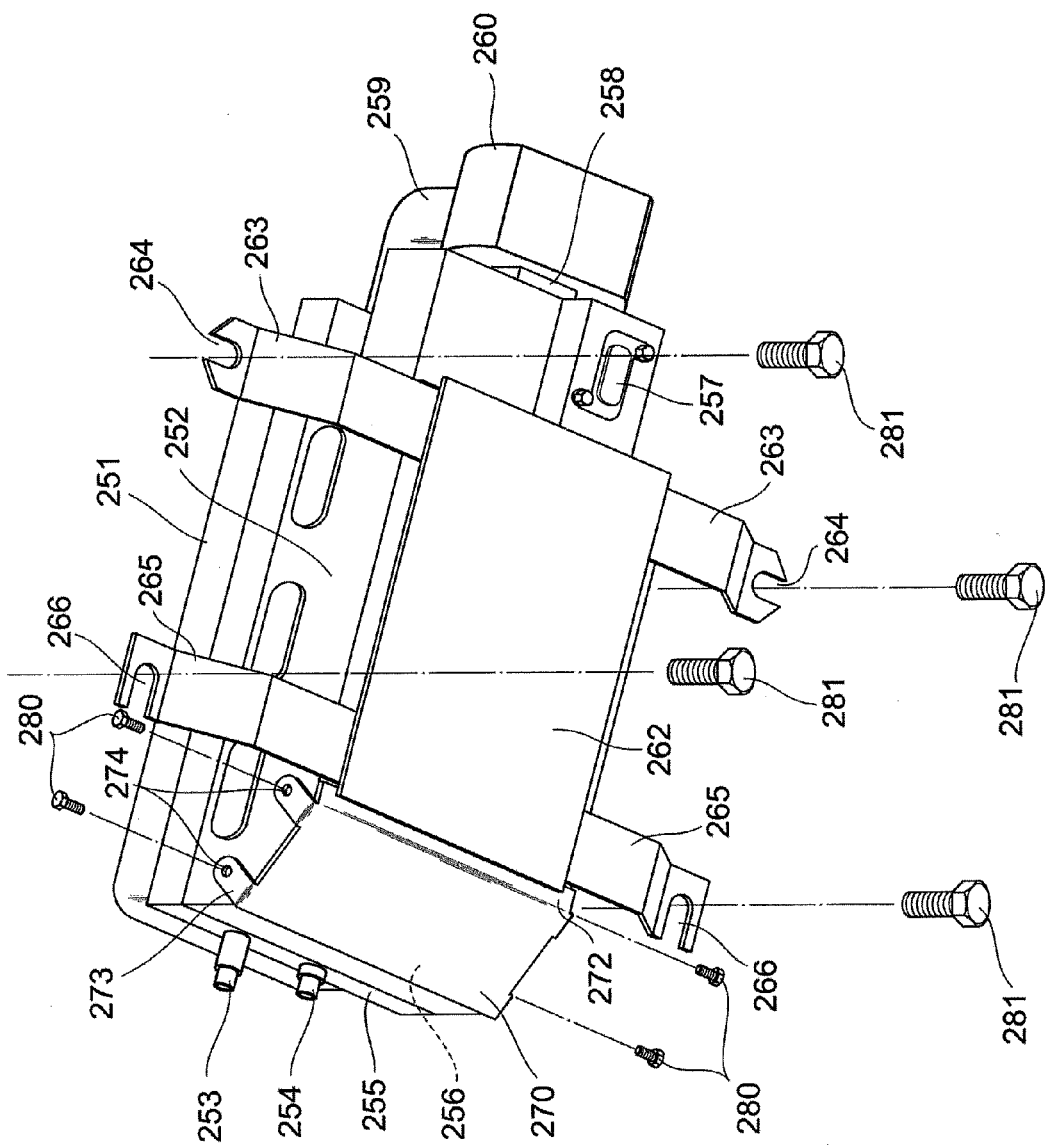
FIG. 7 is a bottom-surface perspective view illustrating the configuration of the converter assembly in embodiment 1.

The configuration of the converter assembly 250 will be described in detail with reference to FIGS. 5 to 7. FIG. 6 is a perspective view seen from above which illustrates the converter assembly 250. FIG. 7 is a perspective view seen from below of the converter assembly 250.

As shown in FIG. 5, the converter assembly 250 is arranged closer to the front of the vehicle 100 than the fuel cell assembly 200. With such an arrangement, regarding the impact of a collision from in front of the vehicle, the converter assembly 250 receives the impact of the collision in advance of the fuel cell assembly 200. If the relay 97 is brought into a cutoff state due to the reception of the impact, the connection between the FC converter 90 and the inverter 93, the inverter 95 and the battery converter 98 is shut off, whereby the fuel cell system 10 can be brought into a safe state.

As shown in FIGS. 5 to 7, the FC converter 90 is configured by joining an upper housing 251 and a lower housing 252. A front surface 255 of the FC converter 90 is provided with a coolant inlet 253 and a coolant outlet 254. Provided at the rear part of the FC converter 90 is a relay portion 257, which contains the relay 97 shown in FIG. 1. Upon receiving the impact of a collision at least at a certain level, the relay 97 electrically separates the secondary side terminals of the FC converter 90 from the input terminals of the inverters 93 and 95 and the secondary side terminals of the battery converter 98.

A power cable 259 is connected to the rear part of the converter assembly 250, and a terminal connector 260 provided at a tip end of the power cable 259 is electrically connected to the fuel cell unit 201. As shown in FIG. 5, a power cord 282 is also connected to the rear part of the converter assembly 250. The power cord 282 is connected to the inverter 93 shown in FIGS. 1 and 2 via the power plug 283 (see FIG. 1 also) provided at a tip end of the power cord 282.

A protruding portion 258 is provided at the rear part of the converter assembly 250 and at the position that faces the terminal connector 260. The protruding portion 258 is provided at the position where, when the impact of a collision is applied to the converter assembly 250, and as a result, the FC converter 90 rotates while slightly moving back, the protruding portion 258 is brought into contact with the terminal connector 260. With the protruding portion 258 being brought into contact with the terminal connector 260, the fuel cell 20 can be short-circuited electrically.

Further, an inclined portion 256 is provided at the front part of the lower housing 252 of the front surface 255 in the FC converter 90. The inclined portion 256 is an inclined surface that is formed such that the normal direction is downward and frontward, and the inclined portion 256 is a protector that functions to change the movement direction of the member brought into contact with the inclined portion 256 during a collision from in front of the vehicle. The FC converter 90 is provided with a front surface protective plate 270 to surround the inclined portion 256. The front surface protective plate 270 is provided with a bent portion 272 that comes around toward the bottom surface of the FC converter 90 for protection. The front surface protective plate 270 is provided with four attaching portions 273, and each of the attaching portions 273 is provided with a fastening hole 274. Bolts 280 being fastening members are inserted into the fastening holes 274 of the attaching portions 273 so as to be fastened into the fastening holes of the side surfaces of the FC converter 90, whereby the front surface protective plate 270 is attached to the inclined portion 256 of the FC converter 90. The front surface protective plate 270 corresponds to the impact suppressing member of the invention, and functions to improve the resistance against the impact of a collision from in front of the vehicle.

Here, the inclined portion 256 is inclined with the normal direction being downward and frontward. Thus, when the structural member such as the front suspension member 112 moves due to the impact of a collision from in front of the vehicle, and is then brought into contact with the front surface protective plate 270 provided in the inclined portion 256, the inclined portion 256 functions to change the movement direction of the structural member to be downward. For example, the member such as the front suspension member 112, which has received the impact of a collision in advance of the FC converter 90, moves backward due to the impact of the collision, and collides with the inclined portion 256, and directly collides with the front surface protective plate 270. At this point, the inclined portion 256 can change the movement direction of the member that is brought into the inclined portion 256, since it is a downward inclined surface.

Further, the FC converter 90 is provided, on the bottom surface side, with a bottom surface protective plate 262. The bottom surface protective plate 262 is a protector for protecting the FC converter 90 against the impact of a collision from below the vehicle, i.e., the bottom surface side. The bottom surface protective plate 262 is provided with mounting portions 263 on the vehicle rear side, and with mounting portions 265 on the vehicle front side. The mounting portions 263 and 265 are members that hold the bottom surface protective plate 262 via the four points of the diagonal lines, and each mounting portion has a bent structure as shown in the figure.

Note that the bottom surface protective plate 262 and the front surface protective plate 270 each can be formed of a metal material having constant rigidity, such as aluminum, SUS or iron.

Advantages of Embodiment 1

(1) According to this embodiment, as shown in FIGS. 2 and 4, the arrangement is employed in which three or more related apparatuses are not aligned in the same straight line. Such an arrangement can reduce the possibility that a multiple collision damages the fuel cell unit 201.

(2) According to this embodiment, the FC converter 90 is arranged closer to the front surface of the vehicle 100 than the fuel cell unit 201. Thus, when the impact of a collision is applied to the vehicle from in front of the vehicle, the impact is applied to the FC converter 90 in advance, and then the secondary side terminals of the FC converter 90 are separated from the electric system of the related apparatuses. In the event of leakage of fuel gas from the fuel cell unit 201, the electric connection with the other related apparatuses has been terminated, leading to the increased safety of the system.

(3) According to this embodiment, the vehicle 100 is provided with the tunnel portion 109 (center bump portion), and the FC converter 90 is arranged below the tunnel portion 109. The connection wiring of the FC converter 90 with respect to the fuel cell 20 can be shortened while utilizing the tunnel portion 109 as a dead space of the passenger compartment.

(4) According to this embodiment, the FC converter 90 is provided with the inclined portion 256 on the vehicle front side, and thus, when the impact of a collision is applied to the vehicle from in front of the vehicle, the direction of the impact is changed by the inclined portion 256. Therefore, the impact applied to the FC converter 90 itself can be alleviated, and also the possibility of the impact of a collision being applied to the fuel cell 20 can be reduced.

(5) According to this embodiment, the front surface protective plate 270, which is an impact suppression member, is attached to the inclined portion 256 of the FC converter 90. Therefore, the resistance against the impact of a collision can be improved.

Embodiment 2

Embodiment 2 of the invention relates to an example in which the FC converter 90 being the related apparatus is arranged on an inclined surface.

In embodiment 1 above, the FC converter 90 is arranged closer to the front of the vehicle than the fuel cell unit 201, and is provided with the inclined portion 256 on the vehicle front side. Embodiment 2 is similar to embodiment 1 above in that the FC converter 90 is arranged closer to the front of the vehicle than the fuel cell unit 201, but differs from embodiment 1 above in that the FC converter 90 is arranged on the inclined surface.

In embodiment 2, the fuel cell system 10 (see FIG. 1) and the structure of the vehicle 100 (see FIGS. 2 and 3) are similar to those in embodiment 1 above. Therefore, the same reference numerals as those in embodiment 1 above are used, and explanations thereof are omitted.

Figure 8:
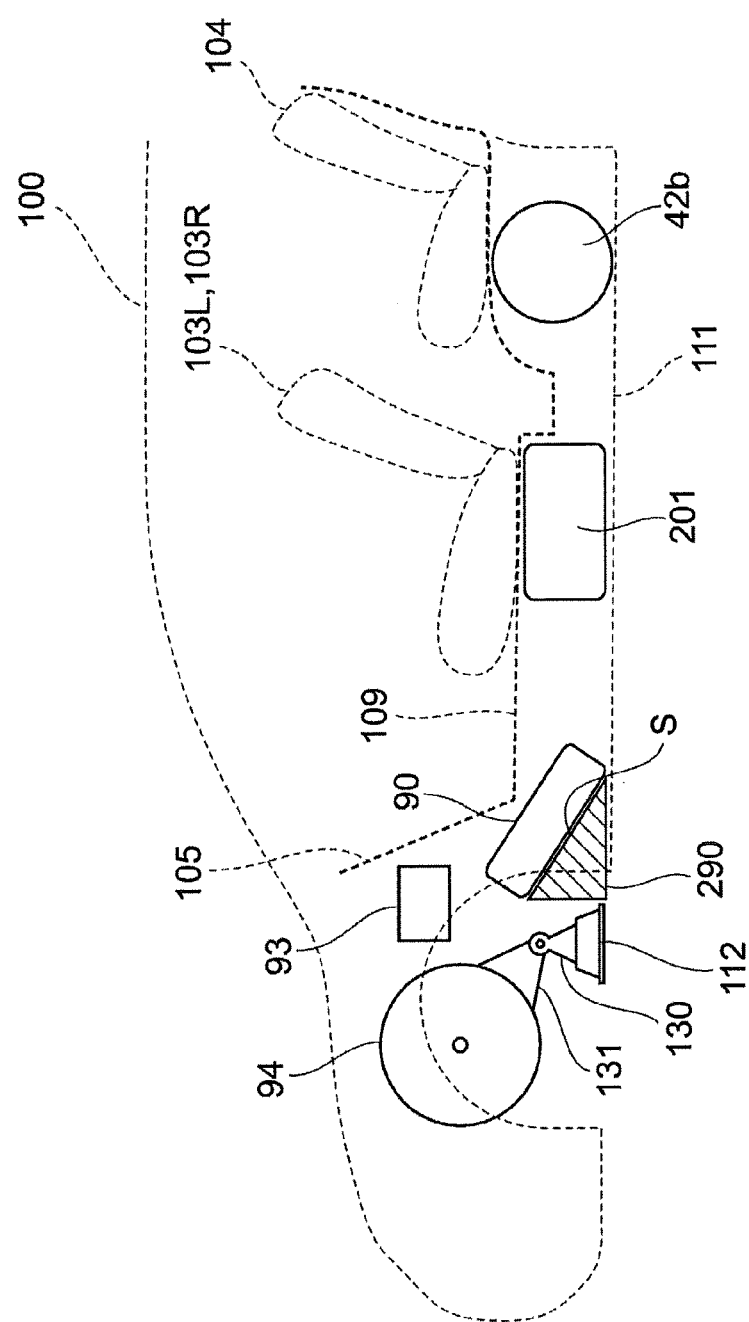
FIG. 8 is a side view of a vehicle which illustrates the arrangement of a fuel cell and the related apparatuses in embodiment 2.

FIG. 8 is a side view of a vehicle which illustrates the arrangement of the fuel cell unit 201 and the related apparatuses in embodiment 2. As shown in FIG. 8, the vehicle-drive motor 94, the inverter 93, the FC converter 90 and the fuel cell 201 are arranged from the front side to the rear side of the vehicle 100. As is apparent from FIG. 8, the related apparatuses such as the vehicle-drive motor 94, the inverter 93 and the FC converter 90 as well as the fuel cell 201 are arranged so as not to be aligned in a straight line.

The vehicle-drive motor 94, the inverter 93 and the fuel cell unit 201 are similar to those in embodiment 1 above.

The FC converter 90 is arranged between the front seats 103L and 103R and is below the tunnel portion 109 as the center bump portion of the dashboard 105. Particularly in this embodiment, the FC converter 90 is mounted on a seat 290. The seat 290 is fixed to the structural components of the vehicle 100. For example, the seat 290 is fastened to one or more of the center frames 114 and 115, the sub-frames 118 and 119 or the side locker members 128 and 129, which are shown in FIG. 3. The seat 290 is provided with an inclined surface S, which is inclined by a predetermined angle with respect to the horizontal plane. The FC converter 90 is mounted on the inclined surface S of the seat 290. The FC converter 90 is fastened to the seat 290 via fastening members (not shown), but it is sufficient that the FC converter 90 is fastened with a force that is released upon the impact of a collision. The inclination angle of the inclined surface S of the seat 290 and the distance between the FC converter 90 and the fuel cell unit 201 are set such that, when gliding over the inclined surface S in the inclination direction, the FC converter 90 is not brought into contact with the fuel cell unit 201.

Figure 9:
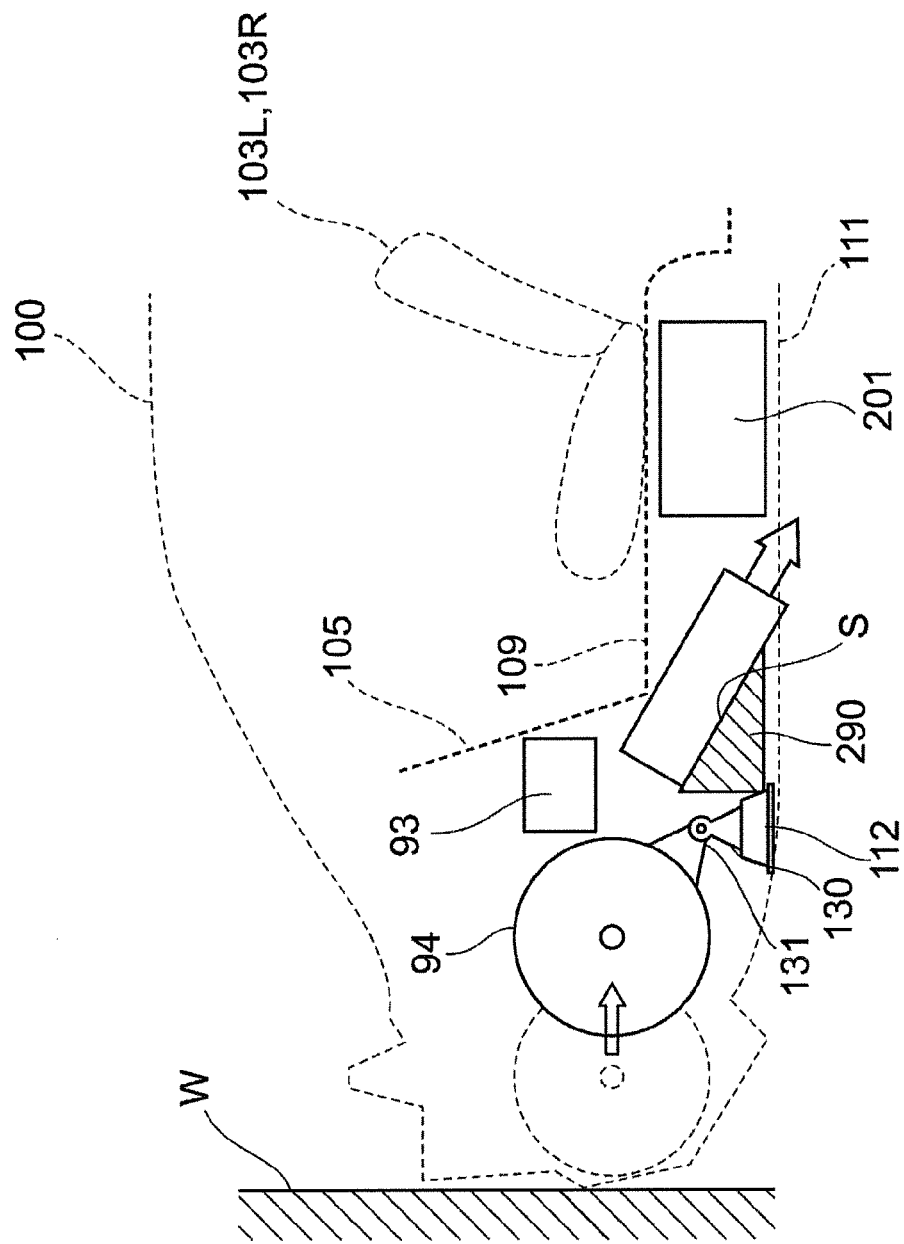
FIG. 9 is a side view of the vehicle which illustrates the movement direction of a DC-DC converter in embodiment 2.

With reference to the vehicle side view shown in FIG. 9, the operation during a collision from in front of the vehicle in embodiment 2 will be described. As shown in FIG. 9, when the impact of a collision from in front of the vehicle is applied to the vehicle 100 due to, e.g., a collision of the vehicle 100 to a barrier W, the vehicle-drive motor 94 and the front suspension member 112 move back. However, the impact of the collision does not affect the fuel cell unit 201 because of two characteristics in this embodiment.

The first characteristic is that related apparatuses are arranged not to be aligned in a straight line. As shown in FIG. 9, the vehicle-drive motor 94 directly collides with the inverter 93. However, the inverter 93 is not arranged in the straight line connecting the FC converter 90 and the fuel cell unit 201. Therefore, this avoids a multiple collision in which: the vehicle-drive motor 94 collides with the inverter 93; the inverter 93 then collides with the FC converter 90; and the FC converter 90 then collides with the fuel cell unit 201. In other words, such a multiple collision can be avoided by arranging three or more apparatuses so as not to be aligned in the same straight line.

The second characteristic is that one of the related apparatuses, i.e., the FC converter 90 in this embodiment, is arranged on the inclined surface S. As shown in FIG. 9, when the impact of a collision is applied to the vehicle from in front of the vehicle, the vehicle-drive motor 94 collides with the FC converter 90 together with the front suspension member 112. When the impact of a collision that exceeds the fastening force between the FC converter 90 and the inclined surface S is applied to the FC converter 90, the fastening of the FC converter 90 is released. Here, since the FC converter 90 is mounted on the inclined surface S, which is inclined by the predetermined inclination angle, the FC converter 90 glides over the inclined surface S. As described above, the inclination angle of the inclined surface S and the distance between the FC converter 90 and the fuel cell unit 201 are set such that, when gliding over the inclined surface S in the inclination direction, the FC converter 90 is not brought into contact with the fuel cell unit 201. Therefore, even if the FC converter 90 significantly glides over the inclined surface S, no impact of a collision is exerted on the fuel cell unit 201. The FC converter 90 that has moved over the inclined surface S is brought into contact with the floor panel 11 and is stopped.

From the above, according to embodiment 2, the FC converter 90 is arranged on the inclined surface S of the seat 290; therefore, when the impact of a collision is applied to the vehicle, the FC converter 90 moves in the inclination direction of the inclined surface S, but does not move in the direction toward the fuel cell unit 201. Accordingly, the FC converter 90 can be prevented from directly being brought into contact with the fuel cell unit 201.

The advantages listed in embodiment 1 apply also to embodiment 2 as long as the advantages do not contradict embodiment 2.

Embodiment 3

Embodiment 3 relates to a modification example of the form of a fuel cell unit.

Figure 10:
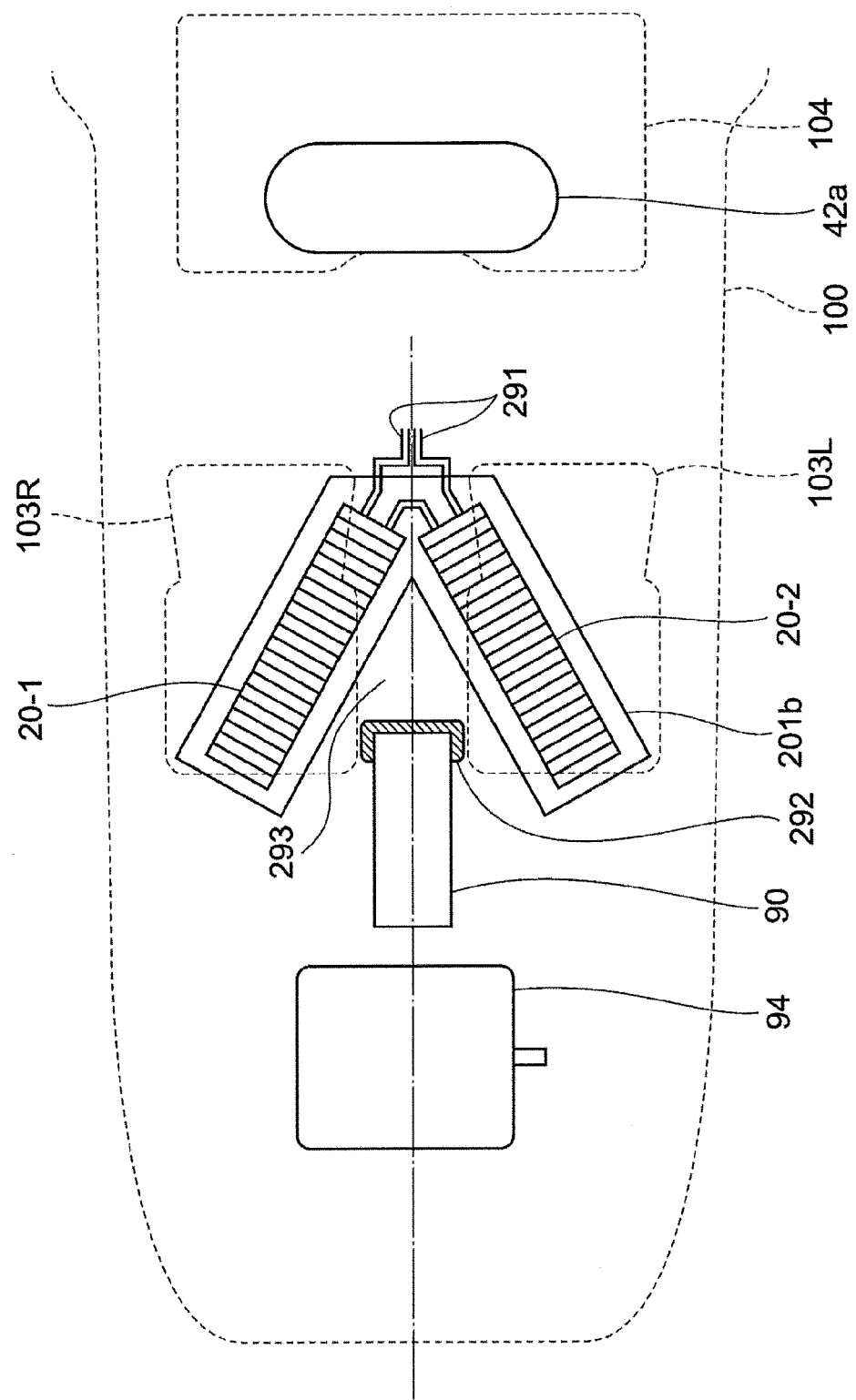
FIG. 10 is a plan view of a vehicle which illustrates the arrangement of a fuel cell and the related apparatuses in embodiment 3.

FIG. 10 is a plan view of a vehicle which illustrates the arrangement of a fuel cell system in embodiment 3. As shown in FIG. 10, a fuel cell unit 201b in embodiment 3 has a two-branch shape in a planar view. The fuel cell 20 contained in the fuel cell unit 201b is divided into a first fuel cell stack 20-1 and a second fuel cell stack 20-2, and these stacks are contained in each of branch-shape housings. Pipes 291 are connected to the first fuel cell stack 20-1 and the second fuel cell stack 20-2 so as to be able to supply an oxidant gas, a fuel gas and a coolant to the stacks. As shown in FIG. 10, the fuel cell unit 201b is arranged below the front seats 103L and 103R such that a two-branch opening portion 293 faces the front of the vehicle.

The FC converter 90 is arranged such that a part thereof enters the opening portion 293 of the fuel cell unit 201b. Although not shown in the figure, the FC converter 90 is arranged in the tunnel portion 109 (see FIG. 4), which is the center bump portion, as with embodiment 1. The FC converter 90 is provided, at a part thereof facing the opening portion 293, with a liquid sealed mount 292 as a cushioning member. The liquid sealed mount 292 is constituted by sealing a liquid, e.g., ethylene glycol, in a mount work formed of an elastic member such as rubber. An elastic member formed of rubber, resin or the like may be provided instead of the liquid sealed mount 292.

Figure 11A:
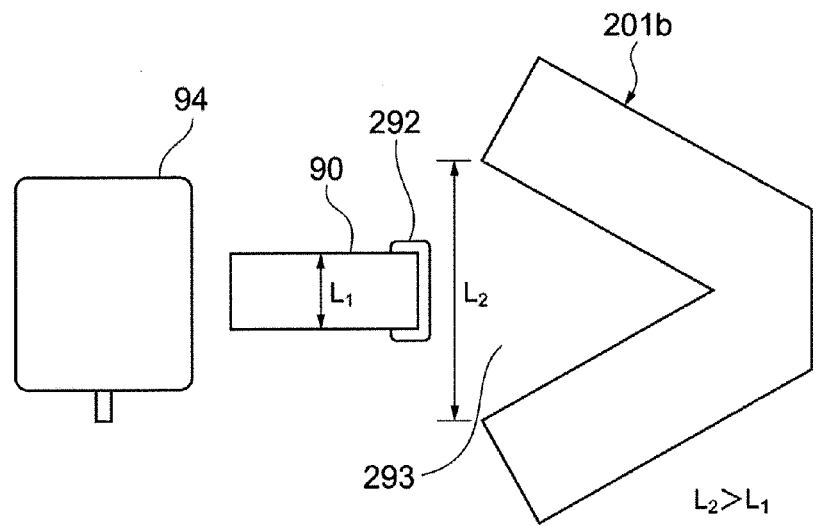
FIG. 11A is a plan view in the case of a non-collision.

FIG. 11A is a plan view illustrating the positional relationship between the FC converter 90 and the fuel cell unit 201b in embodiment 3. As shown in FIG. 11A, a width L2 of the widest part of the opening portion 293 of the fuel cell unit 201b is set to be greater than a width L1 of the FC converter 90. Such a configuration can reduce the possibility of the FC converter 90 being brought into contact with the fuel cell unit 201b even if the FC converter 90 enters the opening portion 293 of the fuel cell unit 201b.

Figure 11B:
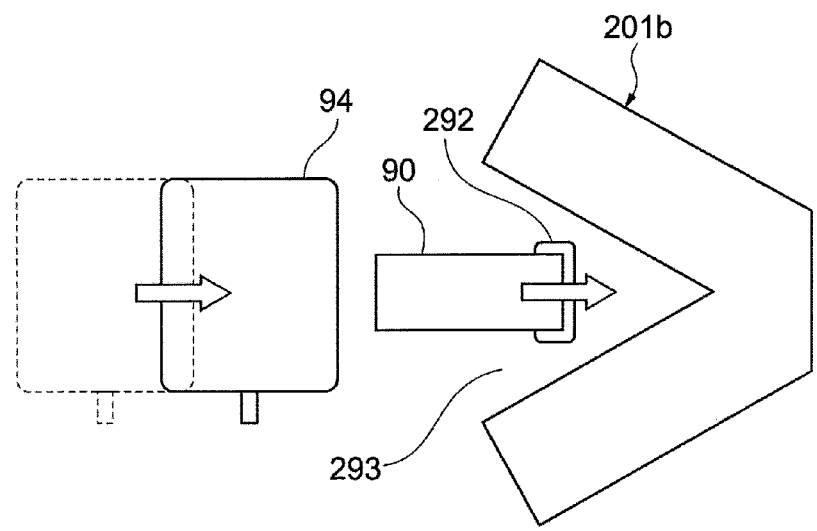
FIG. 11B is a plan view in the case where the DC-DC converter moves due to the impact of a collision.

FIG. 11B is a plan view in the case where the DC-DC converter moves due to the impact of a collision. As shown in FIG. 11B, upon receiving the impact of a collision from in front of the vehicle, the vehicle-drive motor 94 moves in the direction of an open arrow. When the vehicle-drive motor 94 collides with the FC converter 90, the FC converter 90 moves toward the rear of the vehicle due to the impact of the collision. Here, in this embodiment, the FC converter 90 is arranged at the center of the opening portion 293 of the two-branch fuel cell unit 201b. Therefore, even if the FC converter 90 moves toward the rear of the vehicle, the FC converter 90 is not brought into contact with the fuel cell unit 201b, as shown in FIG. 11B. Accordingly, this can reduce the possibility that the fuel cell unit 201b is broken due to the impact of the collision.

Note that the fuel cell does not have to have a branch shape as described in this embodiment. Any shape may be employed as long as, when the related apparatus such as the FC converter 90 slightly moves due to the impact of a collision, the shape avoids contact between the related apparatus and the fuel cell unit. For example, the fuel cell unit may be configured by a plurality of independent sub-units, and an arrangement may be employed in which the related apparatuses are not located in front of the sub-units.

From the above, according to embodiment 3, the FC converter 90 is arranged between the branches of the branch shape of the fuel cell unit 201b. Therefore, even if the FC converter 90 moves due to the impact of a collision, the FC converter 90 can be prevented from being broken through the contact with the fuel cell unit 201b.

According to embodiment 3, the FC converter 90 is provided, at the part facing the fuel cell, with the cushioning member formed by the liquid sealed mount 292. Therefore, even if the FC converter 90 is brought into contact with the fuel cell unit 201b, the impact of a collision can be alleviated.

The advantages listed in embodiment 1 apply also to embodiment 3 as long as the advantages do not contradict embodiment 3.

Embodiment 4

Embodiment 4 relates to an arrangement that is capable of protecting the fuel cell unit 201 against a collision in the width direction of the vehicle 100.

FIG. 12 is a front view of a vehicle which illustrates the arrangement of a fuel cell and the related apparatuses in embodiment 4. FIG. 12 includes a side view, a front view and a plan view.

In embodiment 4, the arrangement of the fuel cell unit 201, the FC converter 90 and the inverter 93 differs from that in embodiment 1 described with reference to FIG. 2. The other matters are similar to those in embodiment 1 above, and thus the same reference numerals as those in embodiment 1 above are used, and explanations thereof are omitted.

As shown in FIG. 12, in this embodiment, the fuel cell unit 201, the FC converter 90 and the inverter 93 are arranged to be aligned in the width direction of the vehicle. The FC converter 90 is arranged at a position closer to the right side surface of the vehicle 100 than the fuel cell unit 201. The inverter 93 is arranged at a position closer to the left side surface of the vehicle 100 than the fuel cell unit 201.

Further, as shown in the front view of FIG. 12, the FC converter 90 is provided, at a part thereof close to the right side surface of the vehicle, with an inclined portion Sa, and the inverter 93 is provided, at a part thereof close to the left side surface of the vehicle, with an inclined portion Sb.

Figure 13:
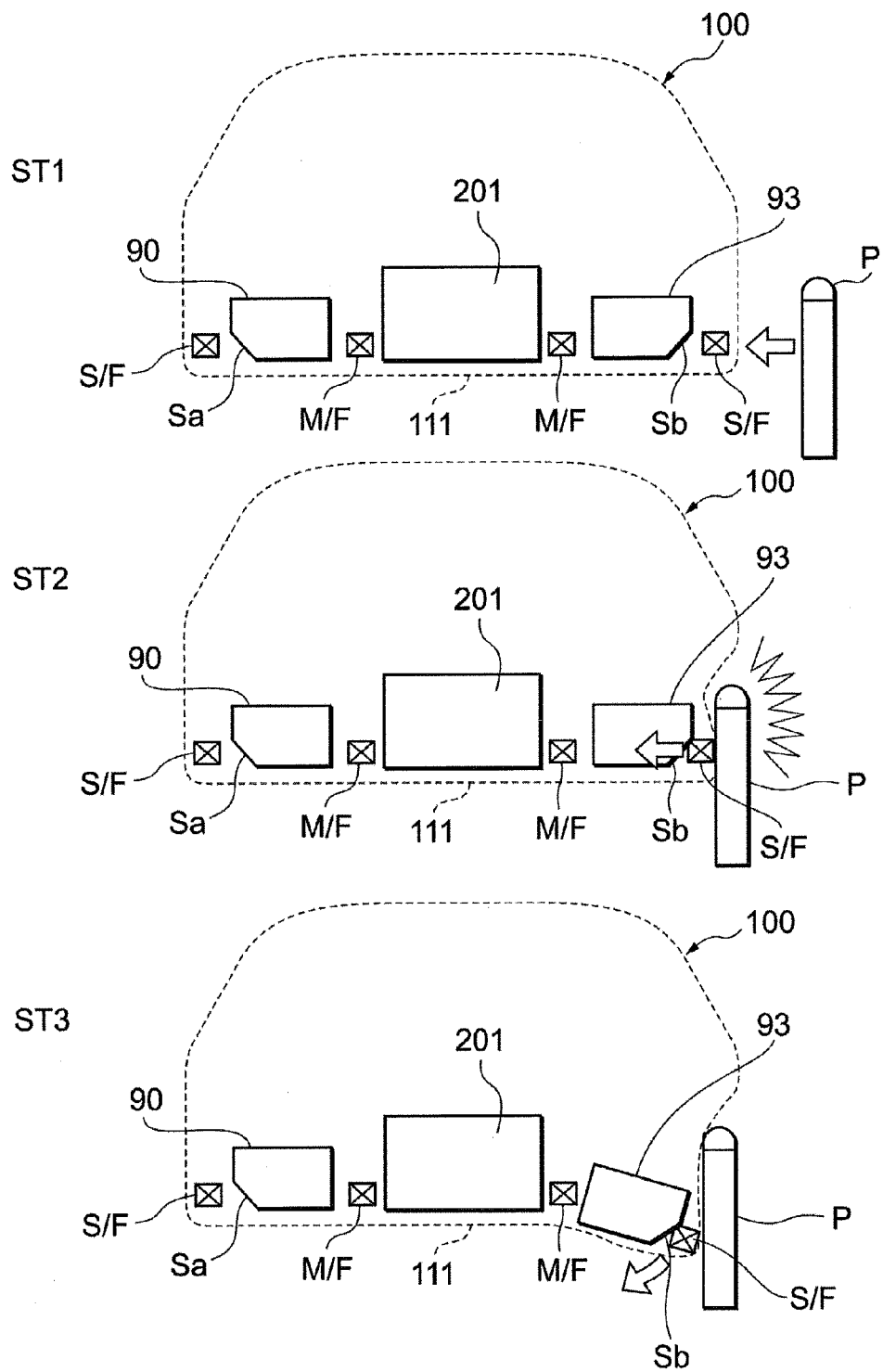
FIG. 13 is a schematic front view of the vehicle which illustrates the operation in the arrangement of the fuel cell and the related apparatuses in embodiment 4.

FIG. 13 shows the operation of the arrangement in embodiment 4. Step ST1 shows the state where an obstacle P is approaching the left side surface of the vehicle. As shown in step ST2, when the obstacle P collides with the left side surface of the vehicle 100, the side surface of the vehicle 100 is deformed due to the impact of the collision, and a side frame S/F moves toward the inverter 93. The inclined portion Sb of the side frame S/F makes contact with the inverter 93. As shown in step ST3, when the side frame S/F, which has received the impact of the collision from the obstacle P, makes contact with the inclined portion Sb of the inverter 93, the movement direction of the side frame S/F is changed by the inclination of the inclined portion Sb. The side frame S/F, of which movement direction has been changed, is deformed downward, which deforms the floor panel 111. Therefore, the inverter 93 fastened to the side frame S/F is dragged by the downward deformation of the side frame S/F, and moves to the lower side of the vehicle 100.

As described above, according to embodiment 4, the FC converter 90 and the inverter 93 are arranged at positions closer to the side surfaces of the vehicle than the fuel cell unit 201, and thus, when the impact of a collision is applied to the vehicle form the vehicle side-surface side, the impact of the collision is applied to these related apparatuses in advance of the fuel cell unit 201, which short-circuit the electric system. Accordingly, even if a leakage of fuel gas, etc., occurs, this does not lead to a hazardous situation.

Further, according to embodiment 4, the FC converter 90 and the inverter 93 as the related apparatuses are provided with the inclined portions. Therefore, when the impact of a collision is applied to the vehicle from the vehicle side-surface side, the direction of the impact is changed, which can reduce the possibility of the impact exerted on the fuel cell unit 201.

The advantages listed in embodiment 1 apply also to embodiment 4 as long as the advantages do not contradict embodiment 4.

Other Modification Examples

The present invention is not limited to the embodiments above, and may be applied with modifications in various ways.

For example, in embodiments 1 and 4 above, the inclined portions are provided to the FC converter 90 and the inverter 93, but the inclined portions may also be provided to other related apparatuses.

Further, in embodiment 2, the FC converter 90 is located on the inclined surface S, but any other related apparatus may be located on the inclined surface S.

Further, in embodiment 3, the FC converter 90 is located between the branches of the branch shape of the fuel cell unit 201b, but any other related apparatus may be arranged therebetween.

Further, embodiments 1 to 3 each illustrate the arrangement for alleviating the impact of a collision from in front of the vehicle, and embodiment 4 illustrates the arrangement for alleviating the impact of a collision from the vehicle width direction. These arrangements may be applied to an arrangement for alleviating the impact of a collision from behind the vehicle. The related apparatus may be arranged closer to the rear surface of the vehicle than the fuel cell unit; if necessary, the related apparatus may be provided with an inclined portion and located on an inclined surface, and the fuel cell unit 201b may be opened toward the vehicle rear side.

INDUSTRIAL APPLICABILITY

The fuel cell system of the present invention may be applied not only to vehicles but also to mobile objects in other forms. The fuel cell system may be applied to ships, airplanes, submarines, etc., as such mobile objects. This is because, with the fuel cell system of the invention, a mobile object in any form can effectively protect a fuel cell as the core against the impact of a collision. In particular, by applying the invention, even a mobile object with weight limits can effectively protect a fuel cell against the impact of a collision exerted from various directions for the mobile object due to the lightweight structure of the fuel cell system.

3: coolant supply system, 4: fuel gas supply system, 7: oxidant gas supply system, 9: power system, 10: fuel cell system, 20, 20b, 20c: fuel cell, 21: polymer electrolyte membrane, 22: anode, 23: cathode, 24: membrane electrode assembly, 25: anode gas channel, 26: cathode gas channel, 31: cooling path, 32: temperature sensor, 33: radiator, 34: valve, 35: coolant pump, 36: temperature sensor, 40: fuel gas supply path, 42: fuel gas supply device, 42a: first fuel gas tank, 42b: second fuel gas tank, 43: main valve, 44: pressure sensor, 45: ejector, 46: cutoff valve, 51: circulation path, 52: cutoff valve, 53: gas-liquid separator, 54: discharge valve, 55: hydrogen pump, 57: revolution speed sensor, 58, 59: pressure sensors, 61: exhaust flow path, 62: diluter, 63: purge valve, 65: muffler, 71: oxidant gas supply path, 72: oxidant-off gas discharge path, 73: pressure sensor, 74: air cleaner, 75: air compressor, 76: humidifier, 77: pressure regulating valve, 80: controller, 82: ignition switch, 84: voltage sensor, 86: current sensor, 90: fuel-cell DC-DC converter (FC converter), 91: battery, 92: battery computer, 93, 95: inverters, 94: vehicle-drive motor, 96: high-voltage auxiliary apparatus, 97: relay, 98: battery DC-DC converter (battery converter), 99: revolution speed sensor, 100: vehicle, 101: front tire, 102: rear tire, 103: front seat, 103L: left front seat, 103R: right front seat, 104: rear seat, 105: dashboard, 106: front pillar, 107: center pillar, 108: rear pillar, 109: tunnel portion, 110: front cross member, 111: floor panel, 112: front suspension member, 113: deformation promoting portion, 114, 115: front frames, 116, 117, 120, 121, 124, 125, 137, 205, 207, 228-233, 242-245: fastening holes, 118, 119: sub-frames, 122, 123: brackets, 126: first cross member, 128, 129: side locker members, 130: motor mount, 131: attaching rubber, 132: second cross member, 136: third cross member, 138: fourth cross member, 140, 141, 152, 153: binders, 144, 151: sub-cross members, 146, 147: rear locker members, 150: fifth cross member, 160: rear cross member, 200: fuel cell assembly, 201: fuel cell unit, 202: upper housing, 203: lower housing, 204: upper flange, 206: lower flange, 253: coolant inlet, 254: coolant outlet, 220: protective structure, 221: frame structure, 222: columnar member, 223: reinforcing frame, 224-227: attaching portions, 234, 235: inclined frames, 236: attaching seat, 250: converter assembly, 251: upper housing, 252: lower housing, 255: front surface, 256: inclined portion, 257: relay portion, 258: protruding portion, 259, 282: power cables, 260: terminal connector, 262: bottom-surface protective plate, 263, 265, 273: attaching portions, 264, 266: fastening grooves, 270: front-surface protective plate, 272: bent portion, 274: fastening hole, 280, 281: bolts, 283: power plug, 290: seat, 291: pipes, 292: liquid sealed mount (cushioning member), 293: opening portion, P: obstacle, S: inclined surface, Sa, Sb: inclined portions, S/F: side frame, M/F main frame, W: barrier.

What is claimed is:

1. A fuel cell system provided in a vehicle, comprising:
a fuel cell unit in which a fuel cell is contained; and
a related apparatus that is electrically connected to the fuel cell and that is located adjacent to the fuel cell unit,
the related apparatus being arranged at a position closer to an outer surface of the vehicle than the fuel cell unit in a planar view in a front-back direction or a width direction of the vehicle;
the related apparatus is provided, at a part thereof close to the outer surface of the vehicle, with an inclined portion, and
the related apparatus is arranged at a position where a structural member that moves due to an impact of a collision from in front of the vehicle is to be brought into contact with the inclined portion.

2. The fuel cell system according to claim 1, wherein:
the vehicle comprises a passenger compartment that is provided with a center bump portion; and
the related apparatus is arranged below the center bump portion.

3. The fuel cell system according to claim 1, wherein the inclined portion is formed by a partial shape of a housing of the related apparatus.

4. The fuel cell system according to claim 1, wherein the inclined portion is formed by an impact suppressing member that is attached to the related apparatus.

5. The fuel cell system according to claim 1, wherein the related apparatus is arranged on an inclined surface.

6. The fuel cell system according to claim 1, wherein:
the fuel cell unit has a branch shape of two-direction branches; and
the related apparatus is arranged between the branches of the branch shape of the fuel cell unit.

7. The fuel cell system according to claim 6, wherein one or both of the related apparatus and the branch shape of the fuel cell is/are provided, at a part where the related apparatus and the fuel cell face each other, with a cushioning member.

8. A fuel cell system provided in a vehicle, comprising:
a fuel cell unit in which a fuel cell is contained; and
a related apparatus that is electrically connected to the fuel cell and that is located adjacent to the fuel cell unit, wherein:
the fuel cell unit is arranged below a seat arranged in a passenger compartment of the vehicle;
the related apparatus is arranged below a center bump portion provided to the passenger compartment;
the related apparatus is provided, at a part thereof close to an outer surface of the vehicle, with an inclined portion, in a planar view in a front-back direction or a width direction of the vehicle, and
the related apparatus is arranged at a position where a structural member that moves due to an impact of a collision from in front of the vehicle is to be brought into contact with the inclined portion.

* * * * *